United States Patent
Champagne et al.

(10) Patent No.: US 7,653,689 B1
(45) Date of Patent: Jan. 26, 2010

(54) INTELLIGENT VIRTUAL CONTENT DISTRIBUTION NETWORK SYSTEM AND METHOD

(75) Inventors: Matt Champagne, Seattle, WA (US); Roger Benz, Quincy, IL (US); Jim Kott, Kirkland, WA (US); Aric Kollmyer, Redmond, WA (US)

(73) Assignee: Abacast, Inc., Camas, WA (US)

( * ) Notice: Subject to any disclaimer, the term of this patent is extended or adjusted under 35 U.S.C. 154(b) by 113 days.

(21) Appl. No.: 10/440,388

(22) Filed: May 16, 2003

Related U.S. Application Data

(60) Provisional application No. 60/319,257, filed on May 17, 2002, provisional application No. 60/319,283, filed on May 31, 2002, provisional application No. 60/319,284, filed on May 31, 2002, provisional application No. 60/319,285, filed on May 31, 2002, provisional application No. 60/319,286, filed on May 31, 2002, provisional application No. 60/319,287, filed on May 31, 2002, provisional application No. 60/319,288, filed on May 31, 2002.

(51) Int. Cl.
*G06F 15/16* (2006.01)

(52) U.S. Cl. .................. 709/206; 709/203; 709/219; 709/227; 709/229; 709/248

(58) Field of Classification Search ................ 709/206, 709/219, 227, 229, 248, 203; 714/4
See application file for complete search history.

(56) References Cited

U.S. PATENT DOCUMENTS

| | | | |
|---|---|---|---|
| 6,687,846 B1* | 2/2004 | Adrangi et al. | 714/4 |
| 7,181,523 B2* | 2/2007 | Sim | 709/226 |
| 2002/0147774 A1* | 10/2002 | Lisiecki et al. | 709/203 |

* cited by examiner

*Primary Examiner*—Yves Dalencourt
(74) *Attorney, Agent, or Firm*—DLA Piper LLP (US)

(57) ABSTRACT

A method and system of use of a Content Distribution Network (CDN), wherein server functionality and client functionality are unbundled. Client software, which governs the accesses and request of the information from the CDN (i.e., server) is provided by a "thin" client architecture. The thin client software is capable of running on an as needed basis, therefore not allocating significant portions of available memory, except when being accessed. The server functionality retains the bulk of the software functionality to manage locally stored content, process content requests, and forward the requested data to content requesters running the client software.

21 Claims, 18 Drawing Sheets

INTELLIGENT VIRTUAL CONTENT DISTRIBUTION NETWORK SYSTEM AND METHOD

RELATED APPLICATIONS/PRIORITY CLAIM

This patent application claims priority under 35 USC 119 to 1) U.S. Provisional Patent Application Ser. No. 60/319,257, filed on May 17, 2002 and entitled "METHOD AND SYSTEM FOR FUNCTIONAL SEPARATION IN A CONTENT DISTRIBUTION NETWORK"; 2) U.S. Provisional Patent Application Ser. No. 60/319,283, filed on May 31, 2002 and entitled "SYSTEM AND METHOD FOR CENTRALLY MANAGING A DISTRIBUTED CONTENT DELIVERY NETWORK"; 3) U.S. Provisional Patent Application Ser. No. 60/319,284, filed on May 31, 2002 and entitled "SYSTEM AND METHOD FOR AN INCENTIVE CLASS STRUCTURE IN A CONTENT DELIVERY NETWORK UTILIZING DISTRIBUTED COMPUTING; 4) U.S. Provisional Patent Application Ser. No. 60/319,285, filed on May 31, 2002 and entitled "SYSTEM AND METHOD FOR LIMITING THE BYTES THAT CAN BE UPLOADED FROM A PEER IN A DISTRIBUTED CONTENT DELIVERY NETWORK"; 5) U.S. Provisional Patent Application Ser. No. 60/319,286, filed on May 31, 2002 and entitled "SYSTEM AND METHOD FOR SECURING CONTENT WITHIN A DISTRIBUTED CONTENT DELIVERY NETWORK"; 6) U.S. Provisional Patent Application Ser. No. 60/319,287, filed on May 31, 2002 and entitled "SYSTEM AND METHOD FOR UPDATING APPLICATION SOFTWARE IN A DISTRIBUTED CONTENT DELIVERY NETWORK"; and 7) U.S. Provisional Patent Application Ser. No. 60/319,288, filed on May 31, 2002 and entitled "SYSTEM AND METHOD FOR USING A DISTRIBUTED CONTENT DELIVERY NETWORK TO DELIVER DIGITAL MEDIA TO WIRELESS DEVICES" all of which are herein incorporated by reference.

FIELD OF THE INVENTION

The present invention relates to a method and system of use of a Content Distribution Network (CDN), and more particularly to a non-facilities based centrally controlled CDN based on distributed computing for distributing digital media.

BACKGROUND OF THE INVENTION

Content Distribution Networks (CDNs) burst onto the digital scene in the late 90's to address the fact that the Internet was not designed to handle large transmissions of Web content over long distances especially when concentrating traffic at a single source. Network congestion and traffic bottlenecks, exacerbated by burgeoning payloads of Web traffic, degrades individual Web site performance, compromises network performance and hinders the transfer of information.

CDNs are means to offload some or all of the content (mainly static) delivery burden from the origin server, as shown in FIG. 1. A replica server, which delivers content on behalf of the origin server is typically called a CDN server. CDNs aim to reduce client perceived latency (e.g. web browsers), provide capacity management for the server and provide additional caching.

CDNs address the attendant problems by storing and serving content from many distributed locations rather than from a few centralized origin points. The theory is, by bringing the content to the user, or as close to the user as possible, network congestion is reduced if not eliminated. This is accomplished by using caching technology, wherein CDNs store replicas of content near users, rather than repeatedly transmitting identical versions of the content from an origin server. The result accelerates and improves the quality of content delivered to end users, while lowering network congestion and bandwidth costs for ISPs (Internet Service Providers).

There are primarily two ways to redirect requests to the CDN servers. One is a Domain Name System (DNS) redirection, wherein an authoritative DNS server is controlled by the CDN infrastructure and distributes the load to the various CDN servers depending on whatever policy is selected, such as round-robin, least loaded CDN server, geographical distance, etc. The other is URL rewriting, wherein the main page still comes from the origin server, but URLs for any embedded objects, such as images and clip art etc. are rewritten, are directed to any of the CDN servers of the system.

The wide scale adoption of peer-to-peer systems, utilized for the distribution of digital content (e.g. Napster and others), has further exacerbated the inherent problems of Web congestion. These systems have heretofore been adopted based on grass roots efforts for free file sharing of digital content. Much attention has been given to the use of P2P (peer-to-peer) technology for the mainstream distribution of digital content. When considering the implications of deploying such a system, issues to once again consider are availability of the network to potential end-users who make content requests (i.e. reach of the system), network transparency, ease of use, network security and privacy (including piracy protections), network quality of service (for example, speed of delivery and reliability), incentive structures for specific end-users who, for example, shared resources with the network and class structures based business rules such as user participation in the network.

Despite the many advances the prior art still has many deficiencies, problems and short-comings. For example, existing P2P systems require users to download a client application and become part of a community that shares content. Studies have shown that nodes in peer-to-peer systems are either mostly clients or mostly servers of content, even though the architecture and implementation of such systems allow nodes to act in either of these two roles. We will refer to nodes in this invention, also called edge machines, as any computing device that has installed a distributed software application for the primary purpose of making content requests from the network or delivering content to other nodes. Furthermore, these applications require significant storage and computing resources on the end-user's machine. These architecture approaches burdened peers acting exclusively as clients, sometimes referred to as Requestors of content, by forcing them to have all of the machinery required for them to operate as distributors as well.

Additionally, many users, such as gamers, prefer to use their corporate or university connections to download large content blocks based on the available bandwidth provided by their employer. Systems that require a resource intensive application or that attempt to open outgoing connections to unknown hosts may be severely limited with respect to these corporate installations. By requiring a resource intensive application that uses unknown services for connections, severe reach limitations of the network are realized through the removal of those applications by IT departments.

Previous systems have been decentralized with respect to introducing and serving content, allowing end-users to control this process. This has resulted in content owners not adopting these systems due to security and copyright concerns.

The use of extensive computing resources forcing users to join specific communities to access content in combination with the active filtering by IT departments have severely restricted reach and created barriers to entry for existing software based content distribution systems. For example, a typical P2P system employing digital content distribution may require a user to install a "thick client" application (in this example 16 MB in size). Additionally, running of the application could require memory resources of 1 MB, even when the application is idle. The system, in this example, establishes outgoing connections, which may be made over private ports, to serve content to other users. Furthermore, content that resides in the network can be introduced by end-users and can be controlled to some level by end-users.

Since most PDAs, cell phones, pagers and other similar devices (i.e. "thin" client devices) have limited memory capacity, the above decentralization technique is not a viable option.

What is needed is a decentralization method and technique capable of being utilized by thin client device architecture, wherein a download manager can be installed on a thin client device, with the download manager being device independent and yet where the Client can still communicate with and take advantage of the entire distributed network. What is further needed is a method to eliminate barriers to end-user participating in the network.

Thus, it is desirable to provide a content distribution network system and method and it is to this end that the present invention is directed.

Another shortcoming of the prior art involves the distributed control associated with existing systems, which can result in very poor quality of service to end users. FIG. 2 is a Prior Art schematic diagram of a P2P system where an inefficient method of cache management is utilized for data chunks. For example, the performance of a distributed CDN is greatly affected by content availability on edge machines. Without proper caching, high latencies serving files to Requesters and high capacity utilization transferring content to the edge machines for caching can adversely impact performance. Today, existing P2P systems use distributed decision-making. The edge machines self select what content to cache and Requesters randomly decide from which edge machines to request content. P2P edge machines utilize well known algorithms to select what content to cache based on which content has been most recently requested. When a request is received for content the edge machine is not caching, the edge machine gets a copy of that content and removes from its cache the less recently accessed content. A deficiency of this distributed decision-making technique is populating caches based on partial system need rather than entire system need (i.e. edge machines perspective rather than systemic need). As a result, edge machines may not cache some content while over-caching other content. This decision is made autonomously without consideration of system need. Edge machines may also thrash content as they constantly alter their caches. By design the edge machines are unaware of each other and consequently, can't organize caches to optimally satisfy Requesters.

In existing P2P systems, Requesters first contact a broker to obtain an entry point into the CDN. The broker randomly notifies the Requester the specific edge machines to contact. This results in Requesters requesting content from edge machines without certainty the edge machine has the content. If the edge machine does not have the content, the Requester waits for the edge machine to retrieve the content into its cache, thus turning the edge machine into a Requester. During the time the edge machine retrieves the content, the original Requester is forced to wait. This chain of turning edge machines into Requesters may occur many times as edge machines hunt for the content. A result is infrequently requested content may get replicated onto more edge machines than is desirable and Requesters encounter delays getting the desired content. Alternatively, Requesters can contact another edge machine rather than waiting for the contacted edge machine to retrieve the missing content. This may avoid the delay of an edge machine retrieving the missing content. However, it does not prevent an over replication of the content as each edge machine contacted while the Requester searches for the content will add the missing content to its cache. Even if Requesters find an edge machine with the desired content, the edge machine may be busy serving content to another Requester. This forces both Requesters to share the serving capacity of the Requester or forces the second Requester to continue hunting for the content. Therefore, current systems are characterized by inefficient utilization of available cache for content storage, higher wait times to access content based on availability, and poor capacity utilization.

What is needed is a Centrally managed edge machine cache and intelligent routing of Requesters that results in improved performance by reducing latency and reducing bandwidth utilization.

Another set of deficiencies, problems and short-comings with the prior art involves not associating user behaviors to rewards provided by the network, or network service provider. For example, existing P2P systems require users to download a client application and become part of a community that shares content. Studies have shown that nodes in peer-to-peer systems are either mostly clients or mostly servers (of files), even though the architecture and implementation of such systems allow nodes to act in either of these two roles. Furthermore, these applications require significant storage and computing resources on the end-user's machine. These architecture approaches burdened peers acting exclusively as clients by forcing them to have all of the machinery required for them to operate as distributors as well.

Additionally, current P2P systems force users to join a community, with new rules, relationships, and risks. These risks can include the introduction of viruses from untrusted users introducing content, liability associated with storing and serving content without the owners permission, and storing and serving inappropriate content. This severely limits the reach of such systems, when compared to standard download methods such as FTP and HTTP sites. The "value" provided to joining a community has heretofore been access to content in the community, usually free content that many times violates copyright law and accounts for significant losses to content owners/distributors. Previous systems have also been decentralized with respect to introducing and serving content, allowing end-users to control this process. This has resulted in content owners not adopting these systems due to security and copyright concerns.

Finally, current systems don't control class of service based on user behavior. For example, a user who provides resources to the network, be it storage or fees paid for access to exclusive content, does not get rewarded in current systems with a better class of service, such as improved file delivery speed or priority access to the network.

The use of extensive computing resources, lack of reward systems for specific user behavior, risks associated with open systems that allow users to introduce and control content, forcing users to join specific communities to access content in combination with ceding control over content to users have severely restricted reach and created barriers to entry for existing software based Content Delivery Systems. For example, an existing P2P system used for digital Content Delivery may require a user to install an application.

A marked improvement over the Prior Art would utilize a new method and user interface, whereby a new value system is employed, in which a flexible rules based system is utilized to provide specific class of service and associated benefits to designated classes of end users, and where specific promotion and branding could be employed to influence user behavior into a specific class. In this new system, content owners would authorize the introduction of content into the network and to be available to specific classes of users. Another variation of this rules based system would be to specify class of service based on specific content, such that the normal business rules for class of service were overridden and all users would obtain the class of service for the specific content (i.e. a publisher wants the entire community to get a new demo as quickly as possible).

In one scenario, the user is provided value based on joining the community, which could include for example sharing resources or subscribing and paying a fee, and having access to content in the community. The concerns that have been raised by content owners include the unauthorized access and sharing of content within these communities. In addition, even though the user may or may not become a server of data within the community (based on bandwidth connection, preference, etc.), the entire application is loaded on their computer and becomes burdensome. The benefits of current systems include massive scalability, network optimization based on distributing content closer to endpoints, and higher fault tolerance through a high degree of redundancy.

What is needed is a distributed system method and technique where a value system, for example one in which a user is provided enhanced benefits such as improved bandwidth for either joining the community or paying a subscription fee for exclusive content in the community, can be employed. An integral feature of this value system could be based on the functional separation of the server and client functions as described above and which has the added value of expanding the overall network reach.

Still another set of deficiencies, problems and short-comings with the prior art include the inability of existing systems to employ use policies that maximize network utilization. For example, the distributor software, which runs on the edge machines in the network, stores files or file components and uploads these to client machines on request. This distributor function uses disk space, CPU, and bandwidth resources on the computers that run the distributor software. Corporations, government institutions and educational institutions may have use policies that prevent a user's machine from acting as a server and uploading content to others or that specifically limit the amount of data that can be uploaded in a time period. This can result in users being prevented from running the P2P distributor software or from participating in the P2P network.

What is needed is a governor system allows the setting of an upload limit to be done in a number of ways.

Also, the prior art still has many deficiencies, problems and short-comings with respect to properly securing content within the network. For example, splitting a content file into chunks provides the benefit that two or more Requesters can download the same chunk from the same edge machine but avoid simultaneously using the edge machines by being separated by time. Also, splitting the file into chunks means that the system can take advantage of the asymmetrical nature of broadband connections and perform multiple downloads to increase realized bandwidth. However, in this scenario, encryption of content is generally only useful when the sender and receiver use a unique (private) key. This key is generally only shared between the sender and the receiver to reduce the possibility of key theft. With a Distributed CDN, where data chunks are stored statically on edge machines, there is an inability to uniquely encrypt content for each end-user, thus the network becomes insecure. This insecurity results from the sharing of the same private keys on multiple edge machines, which may be not considered secure. The operator could resolve this problem by hosting a centralized system and performing dynamic encryption, but this means the content would need to be served centrally, which defeats the benefits of a distributed content delivery network.

What is needed for security in a Distributed CDN is a system which provides a high level of security while not overburdening the system resources such as processing and bandwidth.

Still another set of deficiencies, problems and short-comings in the prior art involves the inefficiency with digitally updating software on end users computers. For example, software distribution strategies over networks generally recognize that updates to application software are typically sourced from one of a small number of central servers to potentially a large number of clients. Such an approach creates load and networking congestion problems for popular software content as many clients connect simultaneously to these central servers. FIG. 3 depicts a Prior Art Domain Name System for receiving software updates from a central FTP or HTTP server. This can result in a very low quality of service (low speed, denial of access) to the end-user. One response to this problem is building out many dispersed data centers to serve the content, but this has the problem of being very expensive and complex.

What is needed is a distributed method and technique whereby application software is updated via a distributed CDN, that provides massive scalability, redundancy, and reach.

An innovative area for utilizing the technology is wireless content. Wireless networks today are transforming from dial-up based voice services with one direction data to full IP based interactive packet networks. In addition, mobile devices are becoming multi-function, with better processing and storage capability, offering the user a richer experience and added functionality. The integration of voice, data, and mixed media applications is now becoming a reality. As higher bandwidth, always on networks and rich, multi-function mobile devices emerge, a new group of end-user applications will be supported.

Examples of emerging mobile applications include video and games. Wireless games and music are among the top applications driving traffic for wireless data services. Despite the many advances the prior art still has many deficiencies, problems and short-comings. For example, with existing devices and dial-up based networks, most digital media downloads consist of very small files such as ring tones and graphics (less than 100 k files) to customize displays. Emerging wireless networks, such as GPRS and 3G provide higher bandwidth IP packet capabilities, which enable the download of richer digital content including games and music. Wireless operators are building both "walled garden" portals and also teaming with third parties to provide distribution and publishing facilities for games, music and other rich media.

As these networks are introduced to the public, the demand for downloads of digital content will increase dramatically. The performance of the network will be of paramount importance, both from a standpoint of customer satisfaction for the end-user, but also to provide an efficient distribution mechanism to support the underlying business models. Creative models will need to be developed, where the user continues to pay for usage but the total cost of the value added services is compelling to the end-user.

Currently, wireless operators are initiating roaming agreements that allow for customers of one carrier to use the packet based network of another carrier. The plan initially to support download of digital media is for the customer of operator A, who is roaming on operator B, to download digital content via operator A's portal or partner. The network path is therefore from operator A to operator B to the Internet and back. This is an extremely inefficient and costly method, especially when load is placed on the network from digital content downloads.

FIG. 4 is a schematic diagram of a Prior Art Wireless Content Delivery System whereby content is routed across networks to the service provider of origin. Suppose a customer of Operator A, based in German, is roaming onto Operator B's network in Switzerland. Under the current architecture, for a customer to access content based on preferences determined with Operator A, the customer downloads the file, accessing Operator B's wireless network, backhaul data network, data center, inter-exchange network between Operator A and Operator B, Operator A's data center and Internet access to the content provider (and content). In this scenario, latencies would be very high, probability of download failures increases as the number of disparate networks/equipment is accessed, download quality of service would depend on both Operator's networks, and the cost of sending data cross border would be higher.

What is needed is a decentralization method and technique capable of being utilized by thin client device architecture, wherein a download manager can be installed on a thin client device, with the download manager being device independent. What is further needed is a method to route clients to content which is located in proximity to the client, even when roaming on partner networks.

SUMMARY OF THE INVENTION

The present invention overcomes the problems and deficiencies of the prior art by employing: a) a distributed, non-facilities based content distribution network architecture, whereby client and server functions are separated, thus maximizing network reach; b) a distributed, non-facilities based content management system, whereby end-users are not required to join the network or share computing resources; c) a separation of functional components in a software based CDN, whereby a class system can be employed; and d) a software based content distribution network that is device independent and utilizes a thin client download manager.

The invention further provides a non-facilities based content delivery network utilizing distributed computing and centralized management of edge machine caches and that routes content Requesters to edge machines known to have the desired content. The content delivery network in accordance with the invention also provides centrally managed edge machine caching that also maintains an inventory of those caches. The non-facilities based content delivery network also takes into account both demand and file size when determining how often a file needs to be replicated, resulting in a non-uniform replication wherein files, with the same number of concurrent downloads, will have larger files replicated fewer times than smaller files. The non-facilities based content delivery network utilizing distributed computing also uses time separation to route multiple content requesters to the same edge machines to prevent those Requesters colliding at edge machines. This allows one Requester to be downloading a portion of a file from one edge machine while another Requester is downloading a different portion of the same file from a different edge machine and then the two Requesters switching to the other edge machine during a different time period.

The invention also provides a non-facilities based content delivery network utilizing distributed computing whereby edge machines alert a central manager by providing their status (i.e. when they become busy or idle) wherein the central manager uses that information to avoid routing content Requesters to busy edge machines. The invention further provides a virtual, distributed CDN whereby class systems are rules based and require end-users to meet those rules to obtain class status. The system may further comprise a centrally controlled peer to peer ("P2P") system that allows distribution of digital content, with the ability to limit the number of bytes uploaded by participants in the P2P network wherein a governor system monitors the number of bytes uploaded in a time period and prevents the uploading of additional bytes until a new time period begins. In addition, the system has the ability to select content distributors (for delivery of the content) based on different characteristics such as domain or IP address and set the upload limit value on the selected distributors based on the characteristics. The system may also have an improved security system. The system may further comprise an efficient encryption system to minimize computing resources and for sending data files from one to many. In some embodiments, the content delivery system utilizing distributed computing has a central server to enhance security.

In accordance with the invention, the non-facilities based Content Delivery Network utilizing distributed computing architecture permits the updating of application software in a network by using the edge machines to store and serve files and a central server to control and monitor the network. In one embodiment, the client and server functions can be embedded in the application software which provides the built in functionality for future updates of the application software. In another embodiment, the non-facilities based Content Delivery Network architecture utilizing distributed computing, includes P2P "redistributor" software, "client" software, or both which are included on application software media or in an application software install package and these components are installed when the application software is installed or at a later date to update the application software with patches, updates, or new versions via the P2P network.

One embodiment of the content delivery system in accordance with the invention may be used for a wireless device. In this embodiment, the non-facilities based content delivery network with distributed computing utilizes an improved routing schema for the delivery of content. The system may also house data on edge servers local to roaming mobile devices. The system may provide a localized routing scheme for content management whereby the public network is accessed by a gateway function at the local wireless base station. The system may provide a software based Content Delivery Network designed for mobile devices, whereby the client and server functions are separated. The system may also provide a more cost efficient routing schema which bypasses roaming tariff structures and minimizes costs by routing content locally.

Thus, in accordance with the invention, a non-facilities based content distribution network architecture utilizing distributed computing is provided whereby the client and the server functions are separated which maximizes network reach. The system provides a network wherein the end-users are not required to join the network or share computing resources. In a preferred embodiment, a software-based content delivery network is provided whereby a class system can be employed. The software based content distribution network is device independent and utilizes a client download manager in a distributed content delivery network utilizing centralized management of edge machine caches. In accordance with the invention, content requestors are routed to edge machines known to have the desired content. The system may provide centrally managed edge machine caching wherein the central manager also maintains an inventory of those caches so that the content in each cache is known to better route the content. In accordance with the invention, the central manager may provide the non-uniform replication of files across the system. In particular, the demand of the file and file size are factors that are used to determine how often a file needs to be replicated. This results in a non-uniform replication wherein files, despite having the same number of concurrent downloads, that are larger in size will be replicated fewer times than smaller files.

BRIEF DESCRIPTION OF THE DRAWINGS

The accompanying drawings, which are incorporated in and constitute a part of this specification, illustrate embodiments of the invention and together with the description, serve to explain the principles on of the invention.

DETAILED DESCRIPTION OF A PREFERRED EMBODIMENT

The invention is particularly applicable to consumer-based file delivery systems. It is in this context that the invention will be described. It will be appreciated, however, that the technology embodied in the Virtual Network Overlay (VNO™) in accordance with the invention has greater utility, such as to provide streaming media services to users, to provide secure document delivery in corporate or government networks, to be included in core telecommunications facilities such as routers, edge servers, cable modems, and DSL modems, and to enhance existing hardware based digital media systems such as video on demand set-top boxes, personal video recorders, and online game players. Below, an implementation of a software-based content delivery system with separated client side software and server side software is described. The invention, however, is not limited to a software implementation since the functions of the software described herein may also be implemented using embedded hardware devices and the like.

Reference will now be made in detail to the present embodiments of the invention, examples of which are illustrated in the accompanying drawings. Wherever possible, the same reference numbers will be used throughout the drawings to refer to the same or like parts (elements).

Figure 1:
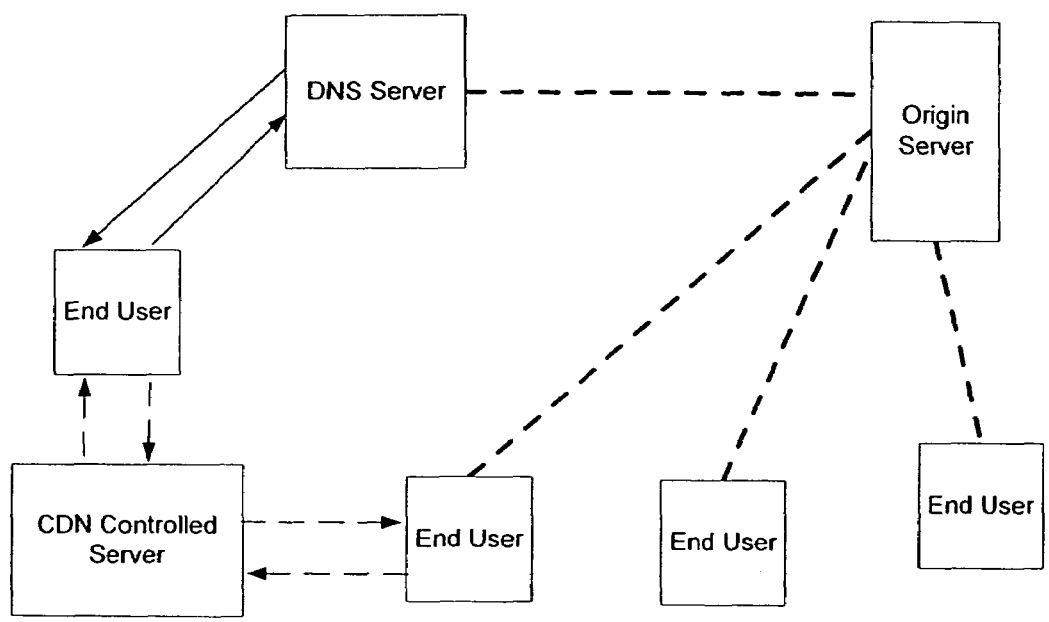
FIG. 1 depicts a Prior Art Domain Name System for redirecting content requests.
Figure 2:
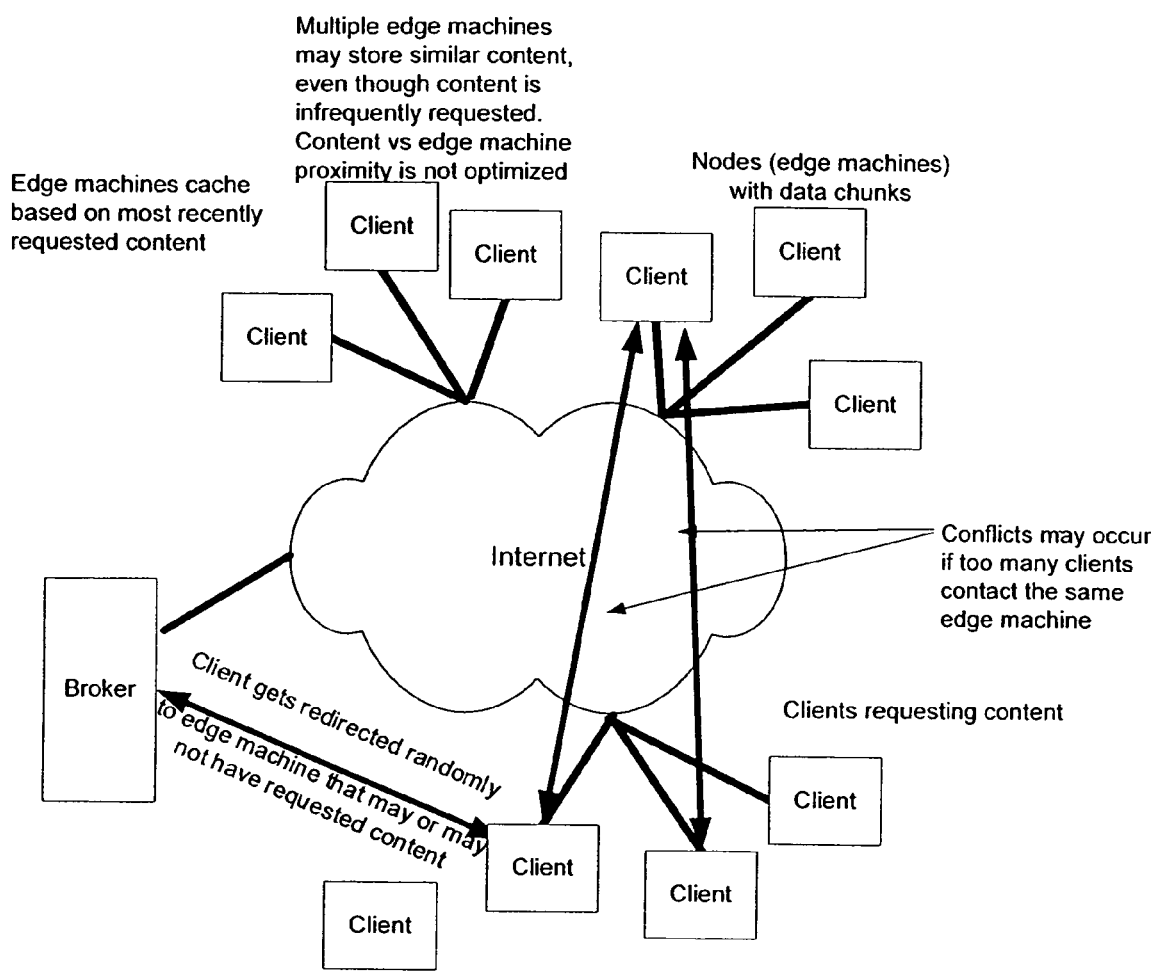
FIG. 2 is a Prior Art schematic diagram of a P2P system where an inefficient method of cache management is utilized for data chunks.
Figure 3:
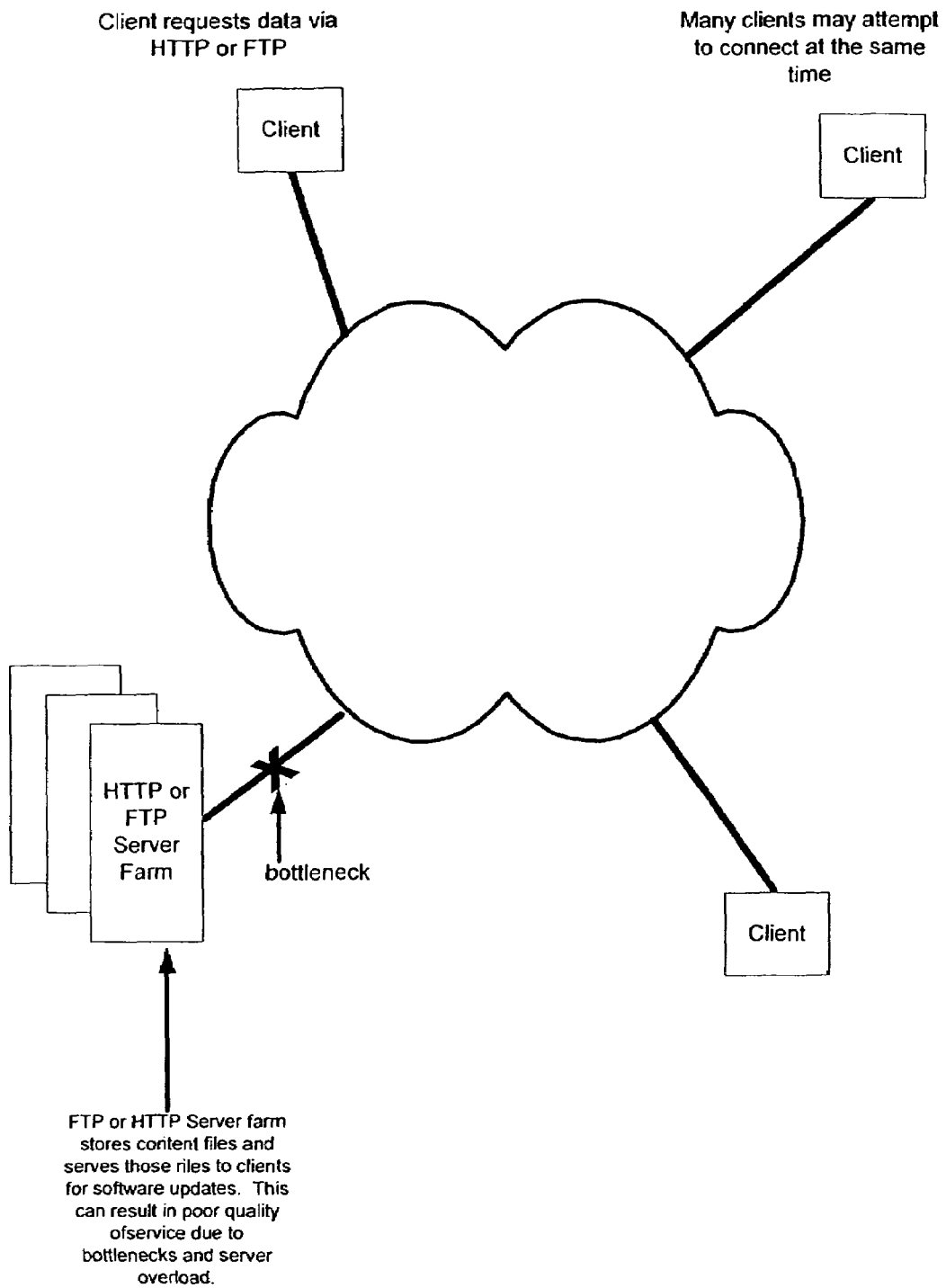
FIG. 3 depicts a Prior Art Domain Name System for receiving software updates from a central FTP or HTTP server.
Figure 4:
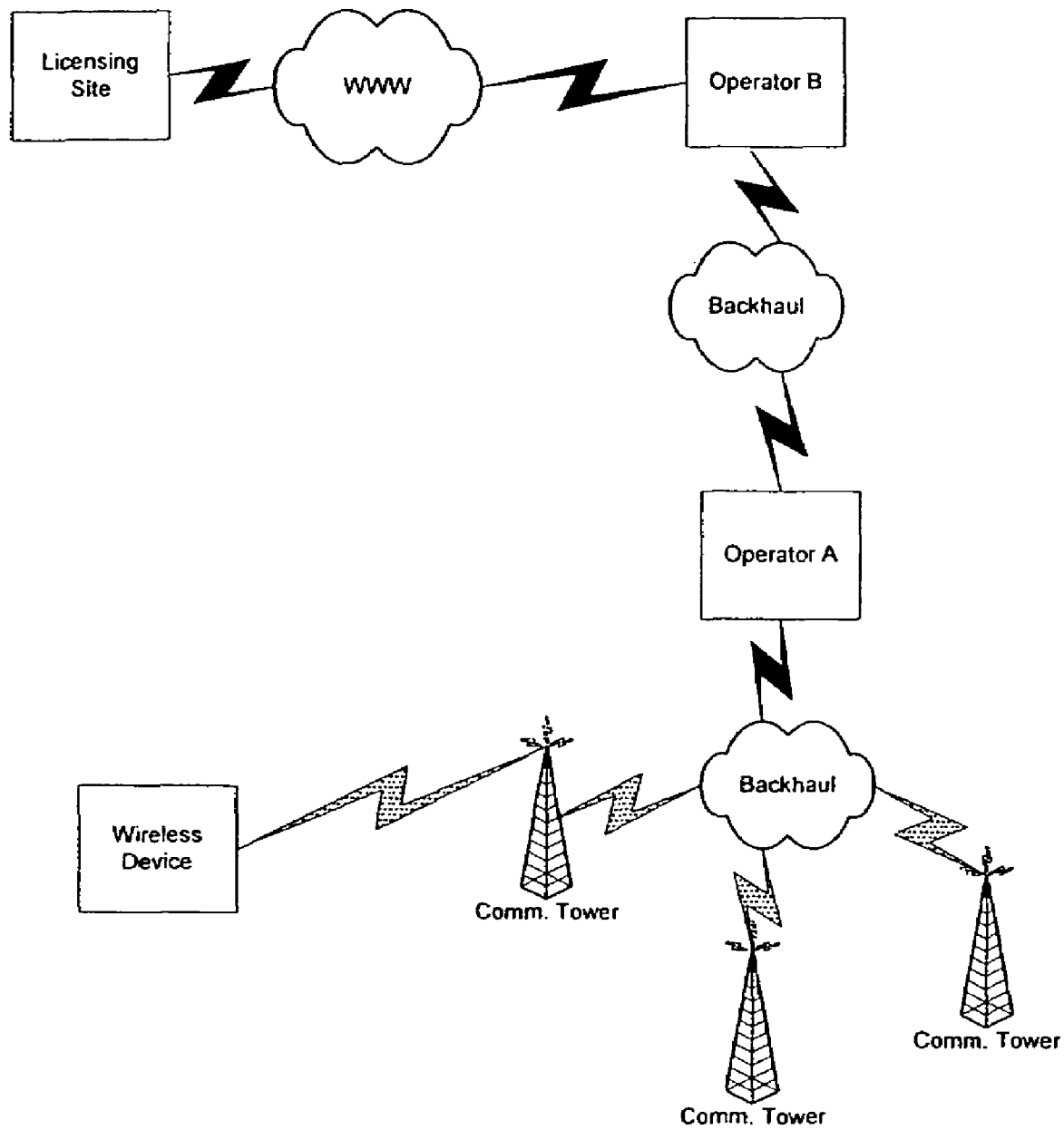
FIG. 4 is a schematic diagram of a Prior Art Wireless Content Delivery System whereby content is routed across networks to the service provider of origin.
Figure 5:
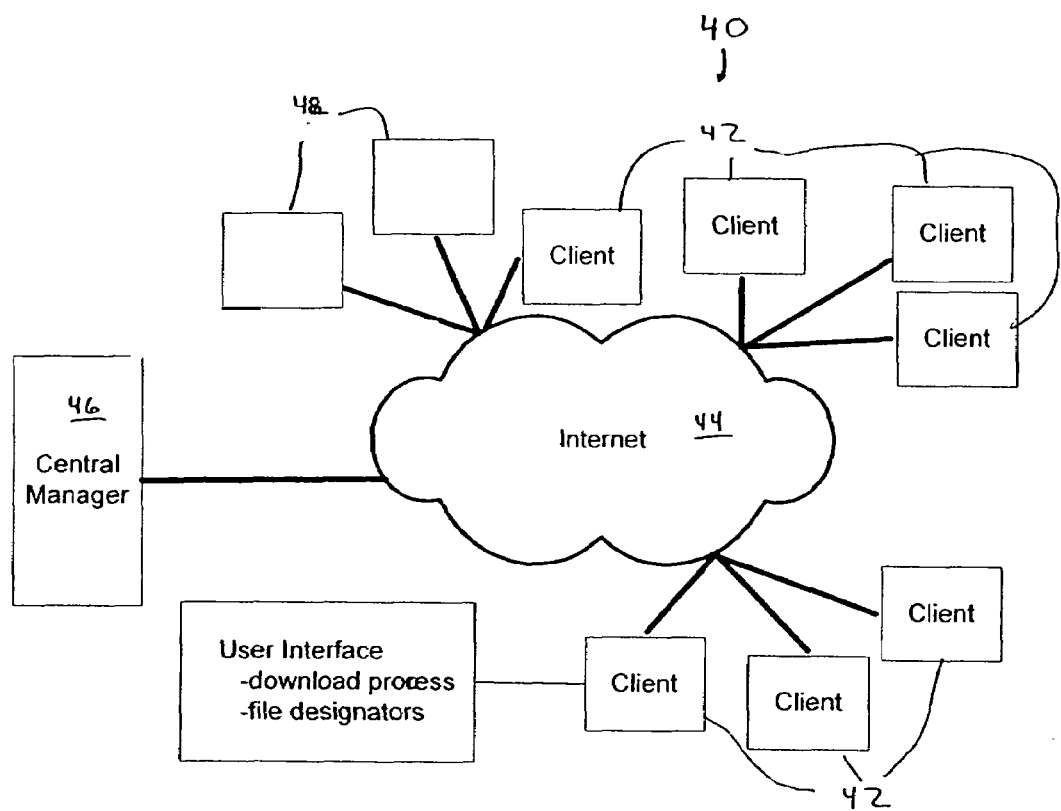
FIG. 5 is a schematic diagram of a client application utilizing separation of functional components of a software based content distribution network of the present invention.

Currently, CDNs enjoy 100% reach due to the fact that standard download interfaces for FTP or HTTP transfers are included in all computer operating systems. Since there is no user-interface to learn, the end-user simply clicks on a link to access content and the simple operating system download user interface (UI) provides feedback to the user on progress. A P2P system 40 for dispersing digital content utilizing the separation of functional components in a software based CDN implementation of the present invention, is depicted in FIG. 5. As shown in FIG. 5, the system 40 may comprise one or more clients 42 that are interconnected together by a computer network 44, such as the Internet as shown in FIG. 5, to a central manager 46. In accordance with the invention, the computer network 44 may also be an internal corporate network, a wireless network, a secure corporate network across the country, etc. and is not limited to any particular type of network. One or more redistributors 48 may also be connected to the computer network 44 and therefore to both the clients 42 and the central manager 46. The clients may include various well known computing resources, such as personal computers, wireless devices, PDAs, cellular phones, etc. that contain typical processors that execute software code in order to implement different functions. The redistributors 48 may each be a typical computing resource, such as a workstation or personal computer, that has at least one processor that executes software to implement different functions. As shown in FIG. 5, each client 42 may download client software which permits access to the content delivery network, provides content delivery management tools and reporting functions. Each redistributor 48 (also known as a node or edge machine) downloads a redistributor application which provides local content storage, delivery and reporting functions.

In accordance with the invention, each client 42 may include a download manager module (described in more detail below and preferably implemented as software that has a plurality of computer code instructions that implement the download manager functionality.) As shown, each client may generate a user interface that permits each end user to control the content download process and determine the current location of the downloaded content. The client 42 in accordance with the invention does not contain additional content delivery software that is executed by the processor of the client 42. Since the client is provided with only the download manager (which may mimic the user interface of the operating systems download client) and not the redistributor 48 (which is described later), there is minimal or no impact to the end-user (which has the client 42) with regard to having to install a "thick client" that requires resources on the end-user's machine and active management by the end-user. This is especially crucial to thin client devices, such as wireless phones and PDAs, where resource usage is at a premium (a client application is an application that runs on a personal computer or workstation and relies on a server to perform some operations, a "thin" client application is designed to be especially small so that the bulk of the data processing occurs on the server). Also, with existing content distribution, the client is not forced to join a community or share computer resources, which provides for 100% reach to all users with respect to the CDN system 40. Finally, application level filtering is not done by IT departments on existing systems since the functionality of FTP and HTTP is considered basic to any office environment.

In accordance with the invention, the download manager (at the client 42) and the redistributor at a server computer (See FIG. 7 for an example of this system 40) may be separated from each other. The functional separation of the server side components from the client download manager in a software based CDN provides several benefits to both end-users and content distributors. The present invention is a non-facilities based "virtual" content distribution network based on distributed computing, whereby functional separation is achieved with respect to the server side components and client download manager. In one embodiment of the present invention, shared services using edge servers are deployed and dispersed across the network and are used to serve data via a client download manager to end-users. The server side software, called a redistributor, is a separate application from the client download manager, which manages the download of digital content for end-users. These functionally separate components may reside on the same machine or different machines, which has several benefits to both end-users and content distributors.

The present invention includes a mesh network, whereby content is cached on suitable edge servers 48 with proximity to end-users called a Virtual Network Overlay™. A minimum bandwidth connection and storage resources may be factors that are used by the system to define suitable edge servers. For example, the central manager 46 may only permit the download of the redistributor content to particular computers which have a predetermined minimum bandwidth connection to the computer network and a minimum storage capacity. Therefore, in one embodiment, thin client devices (such as cellular phones, PDAs and the like) most likely would not initially be considered as edge servers. The network operator can make this distinction optionally via a central management function. However, a small footprint download application manager is required for the end-user device. Existing technologies such as Active X downloads or Java based downloads, just to name a few, can facilitate the installation of the download manager on an end-user device.

A standard operating system user-interface for downloading content can also be utilized, thereby minimizing or eliminating any learning curve by the end-user and also minimizing the impact on the end-user's computer. Since the components are separated, no user interface or a minimal interface is required on the server side application. This means that this application can be thin and yet require minimal resources on the end-users computer.

Figure 6A:
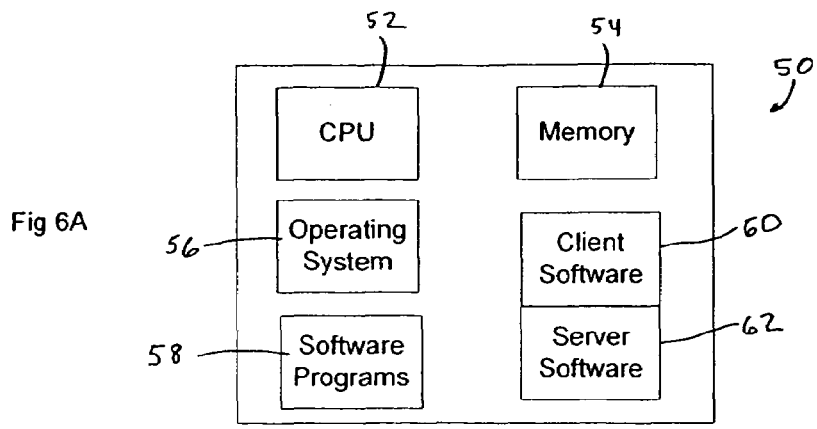
FIGS. 6A-6D are schematic diagrams of the client function and the server function bundled and unbundled in operation.

FIG. 6A depicts a general purpose computer architecture 50 having well known components such as a central processing unit (CPU) 52, a memory 54, such as SRAM or DRAM, and an operating system 56. These components are well known and their structure and operation will not be described further herein. The general purpose computer may be implemented as a wireless device, a PDA, a cellular phone, a personal computer, a workstation, a server, etc. so that the invention is not limited to any particular type of general purpose computer on which the system 40 in accordance with the invention is implemented. Each general purpose computer may further comprise one or more software programs 58 that are executed by the CPU 52 to implement difference functionality as is well known. For example, a computer may store and execute a well known browser application which permits the user of the computer to access and interact with a web server of the world wide web as is well known. In accordance with the invention, a client piece of software 60 and a server piece of software 62 are also shown loaded onto and stored on the computer 50 to facilitate the acquisition and dissemination of digital data in a typical computer system.

Figure 6B:
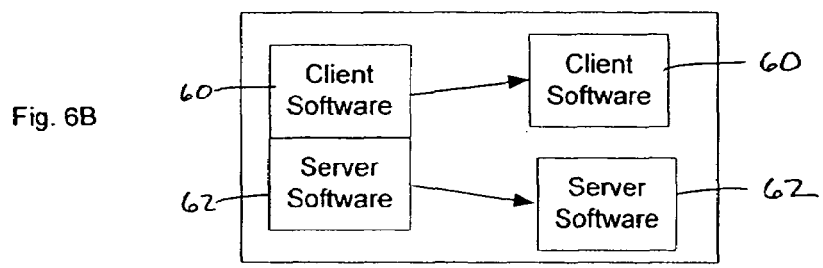
Figure 6C:
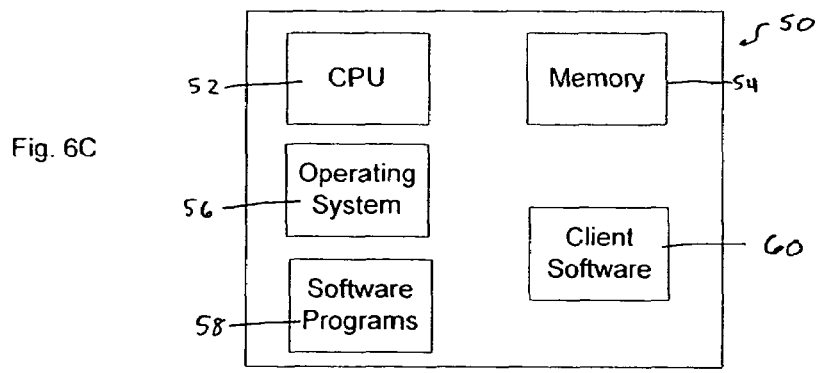
Figure 6D:
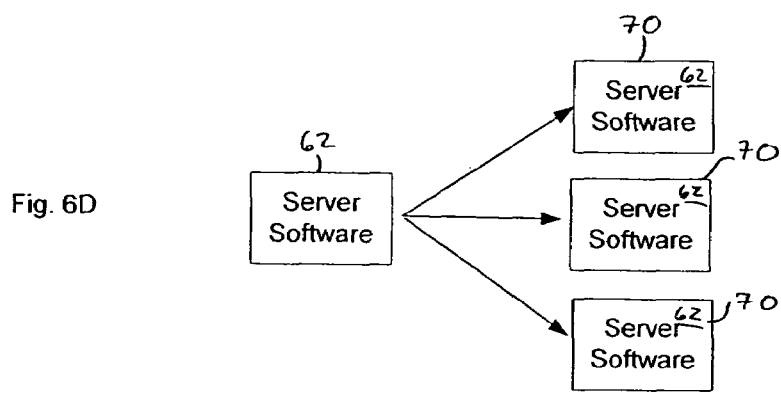

FIG. 6B illustrates the typical general purpose computer 50 that implements the content delivery system in accordance with the invention. In particular, as shown in FIG. 6B the server side software 62 and the client side software 60 (i.e., redistributor software for the server and the client download manager software for the client) are separated. FIG. 6C represents the configuration of the general purpose computer 50 after the unbundling and separation of the server and client software. In particular, FIG. 6C illustrates a general purpose computer 50 which implements the client side software only while another computer would implement the server side software only in accordance with the invention. FIG. 6D depicts one or more devices 70, that are implemented as redistributors, which contain the server software 62 and that could potentially receive the distributed content.

The installation of the server side and client side components of the system could be facilitated via several methods. First, these components could be embedded in a content distributors/owners applications and be enabled automatically by the installation of these applications. Alternatively, these applications could be installed when users request content on the Internet, by the one time download, for example, via an Active X or Java installation.

Figure 7:
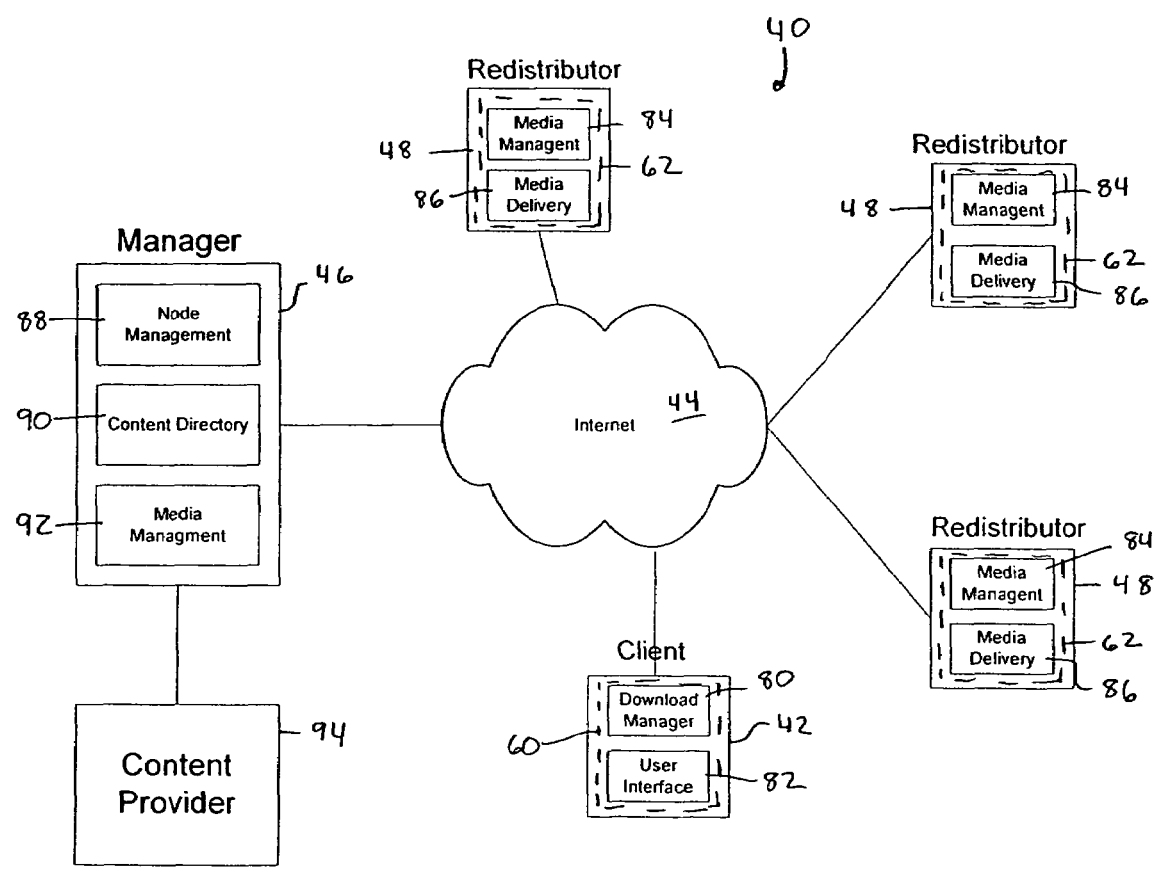
FIG. 7 is a schematic diagram of a Distributed CDN that is centrally managed and show the central Manager function as well as node and client functions in the network of the present invention.

FIG. 7 is a diagram illustrating more details of the content delivery system 40 that has one or more clients 42 (that contain the client software 60), one or more redistributors 48 (that contain the server software 62 separated from the client software) and a manager 46 which are interconnected together by the computer network 44. The redistributors 48 may also be known as nodes or edge machine servers. The nodes 48 can be centrally managed by the manager 46 and provide a more controllable and secure network than is possible with classic peer-to-peer systems. As shown in FIG. 7, each client 42 may include the client software 60 that may further comprise a download manager module 80 that controls the download of the content from the content delivery system 40 and a user interface module 82 that provides the user of the client with a user interface for the content delivery system. In a preferred embodiment, these modules are implemented as pieces of software being executed by the client 42. Each redistributor 48 stores the server software 62 that may further comprise a media manager module 84 that controls the media/content on the redistributor, such as its storage, etc, and communicates with the manager 46 and a media delivery module 86 that controls the download of the content to the clients and receives instructions from the manager on what media to store. These modules 84, 86 are implemented as pieces of software in a preferred embodiment. The manager 46 further comprises one or more pieces of software that implement the functionality of the manager. The manager further comprises a node management module 88 that controls the operation of each redistributor 48 (including the communications with each redistributor), a content directory 90 that maintains the list of the content on each redistributor and a media management module 92 that controls the media/content being uploaded to the system by a content provider 94.

There are many benefits over the prior art resulting from the architecture and method of content distribution of the present invention. First, by deploying a very thin client and standard user interface for the download manager 80, maximum reach is achieved with respect to the user base attempting to access the network since barriers to end-users participating in the network are removed. The use of separation of the client software and the server software also means that the solution is device independent, meaning that the download manager can be installed on a variety of thin client devices such as wireless phones and PDAs and the like. The functional separation also allows for widespread use into corporate networks, minimizing the possibility of active filtering based on application type, thus extending the reach of the network.

The separation of the client and server functions also allows a class system to be employed in the network, whereby a different class of service is offered to different members in the network. For example, this allows the introduction of an incentive system for the redistributors, whereby edge computers that install the redistributor software will receive a premium class of service (such as always being put at the head of the queue, more bandwidth, etc.) as opposed to end-users who only install the client download manager. Thus, the system mimics the user characteristics of the Internet, where some end-users will share resources as opposed to others who will be free-loaders on the network.

Figure 8:
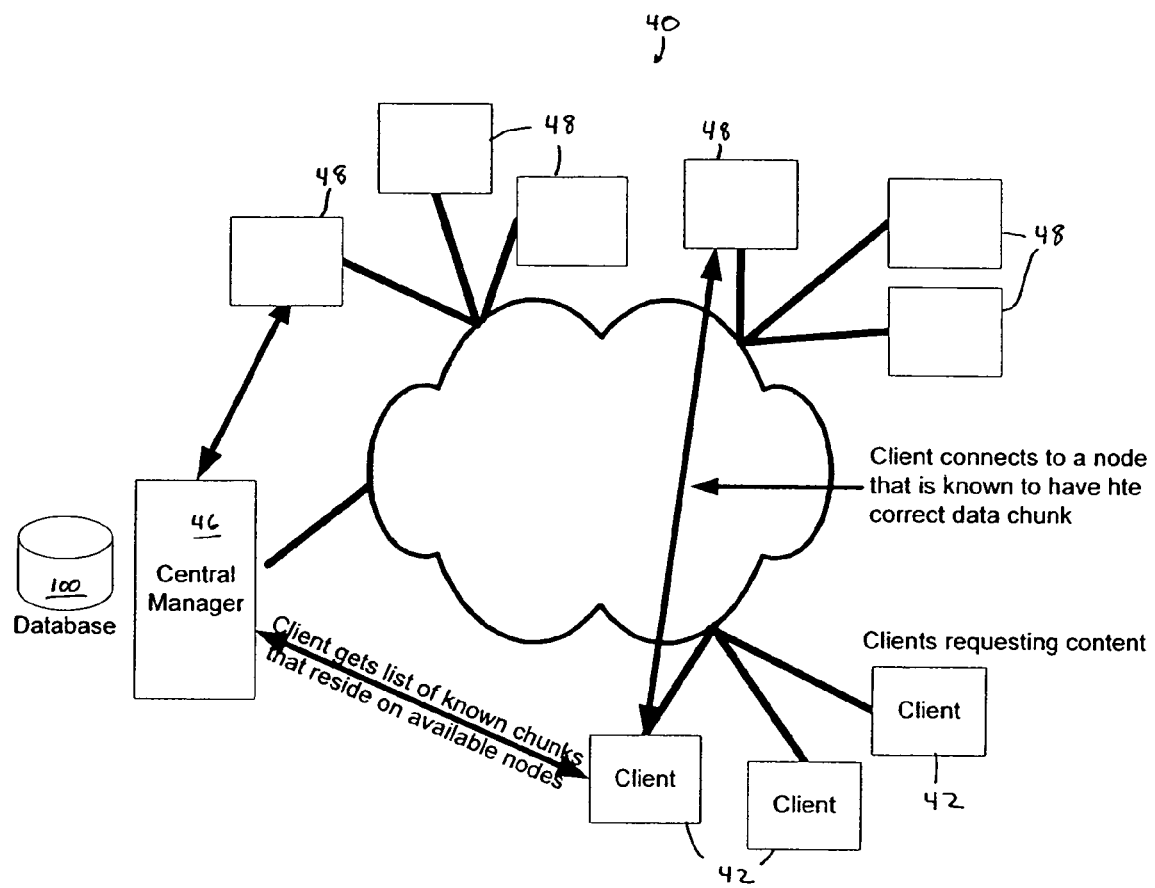
FIG. 8 is a schematic diagram of a Distributed CDN that is centrally managed and connects known data sources with clients as well a provides improved cache management in the network of the present invention.

FIG. 8 is a schematic diagram of a Distributed CDN 40 that is centrally managed and connects known data sources with clients as well as provides improved cache management in the network of the present invention. In particular, the present invention is a non-facilities based content delivery network whereby decision-making regarding cache population and routing Requesters to edge machines is centrally located on what is called a Manager 46. In addition to the Manager, this solution includes a mesh network whereby content is cached on suitable edge servers with proximity to Requesters. This network is called a "Virtual Network Overlay™" (VNO) and the manager can be called the VNO™ Manager. The functions of the Manager 46 include providing centralized control and traffic management in the network, execution of business rules to provide class of service, cache management within the network, accounting of network operations for real time and later retrieval, and monitoring of the network to determine capacity and health. In a VNO system as shown in FIGS. 7 and 8, Managers split each content file into multiple files called chunks, segments, blocks, etc and a directory structure that may be housed in a central database 100 associated with the manager 46 keeps track of each chunk for each piece of content. For example, as each piece of content is split into the chunks and then distributed to the one or more redistributors, a list of each chunk and its location(s) on the redistributors 48 are stored in the database. These chunks are replicated in edge machines caches and all the chunks of a content file are retrieved and reassembled by Requesters (Clients). The replication occurrence is determined by the manager 46, which in turn, instructs the edge machines 48 to alter their respective cache(s).

As shown, each node 48 may contain data chunks of each piece of content wherein the edge machine caches the chunks as controlled by the manager 46 which controls the caches based on the system demand and content characteristics. In the present invention, the Manager 46 determines number of replications for a particular piece of content using many parameters including operator-supplied demand (for example, demand can be defined as the number of Requesters simultaneously downloading a content file), redistributor to client ratio (this is how many redistributors it takes on average to supply a clients capacity, minimum replication amount (i.e. replication is not allowed to be below this level), and actual number of Requesters downloading a file among other parameters.

Figure 9:
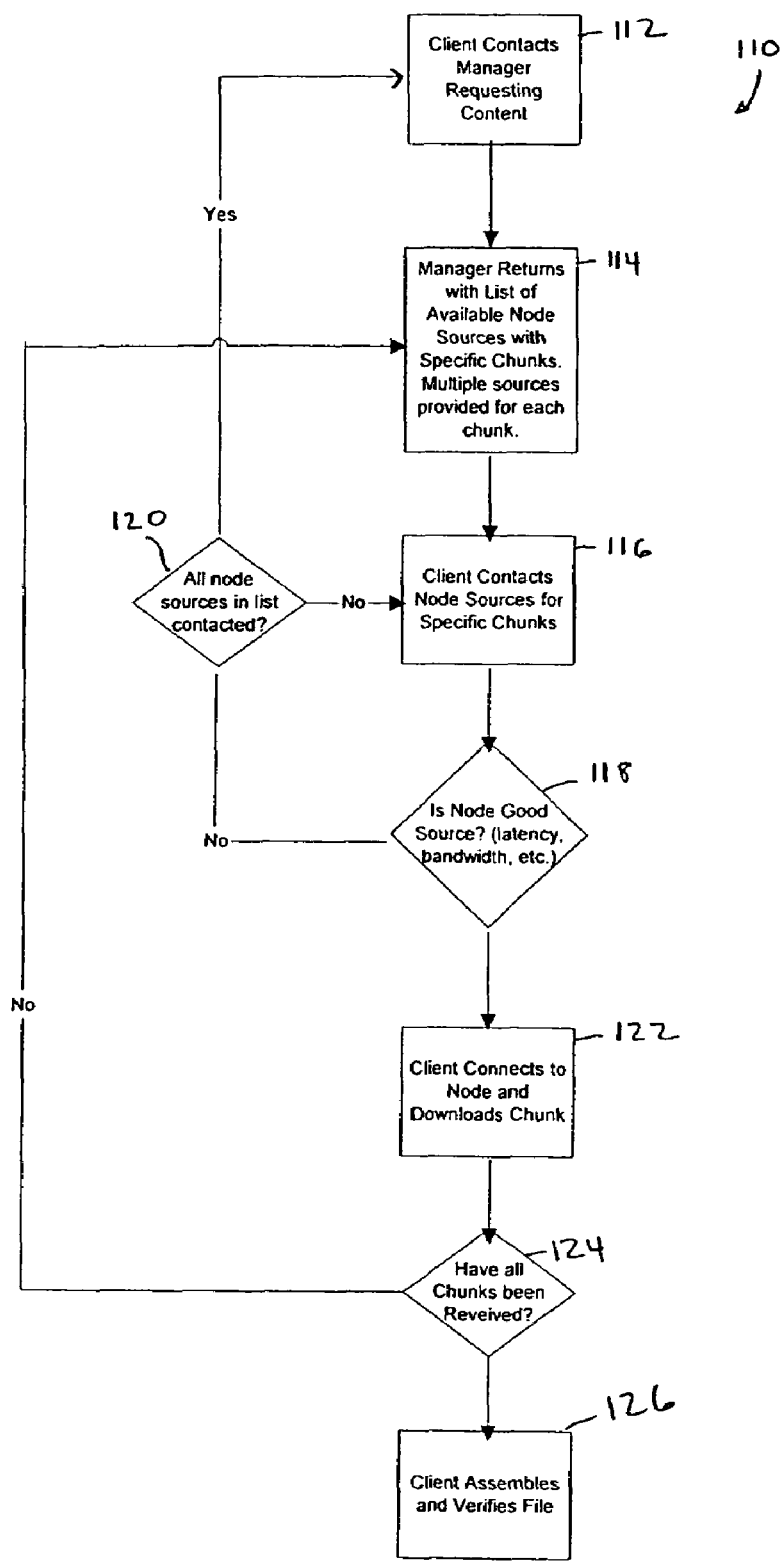
FIG. 9 is a logical flow diagram of a Distributed CDN that is centrally managed and where clients connects to an Intelligent Manager to obtain known data sources from nodes and where the Manager provides improved cache management in the network of the present invention.

FIG. 9 is a logical flow diagram of a Distributed CDN method 110 that is centrally managed and where clients connect to an Intelligent Manager to obtain known data sources from nodes and where the Manager provides improved cache management in the network of the present invention. The Manager instructs edge machines to replace chunk files with under replicated chunk files until the number of replications exceeds the demand level. A further aspect of this invention considers file size when determining replication count. Rather than equally replicating content files based solely on demand, the Manager takes advantage of time separation routing (explained below) and replicates larger content files fewer times than smaller content files. For example, a 100 MB file will be replicated in its entirety ½ as often as a 50 MB file.

As a Manager decides what chunk each edge machine caches, the manager maintains an inventory of those caches. Then when a Requester wishes to obtain a content file, it requests a list of edge machines from the manager. Because the Manager is aware of what each edge machine has, the manager will supply the Requester only with edge machines that are known to be caching the desired content. A further aspect of this invention has edge machines alerting the manager when the edge machine is busy and unable to serve Requesters. While an edge machine is busy, the Manager will no longer source the edge machine to Requesters.

Returning to FIG. 9, the method 110 includes a first step 112 in which a client contacts the manager requesting content. In step 114, the Manager returns a list of available nodes sources with the specific chunks of the content requested by the client wherein multiple sources may be provided for each chunk since each chunk may be replicated on more than one redistributor. In step 116, the client contacts a particular node for a specific chunk of data. In step 118, the client determines if the node is a good source for the chunk (by evaluating the latency, bandwidth, etc.) of the particular node. If the node is not a good source for the chunk, then the client determines if all of the nodes for the particular chunk have been contacted in step 120. If there are other node sources, then the method returns to step 116 to check the next node. If all of the available nodes have been tried by the client, then the method loops back to step 112 so that the client can request other nodes for the chunk.

If the node selected is a good source, then the client connects to the node in step 122 and downloads the chunk. In step 124, the client determines if all of the chunks for the particular piece of content have been received and loops back to step 114 if there are other chunks to be downloaded. Otherwise, in step 126, the client assembles the chunks into the content and verifies the file.

There are many benefits over the prior art resulting from the architecture and method of content delivery of the present invention. First, system latency is significantly reduced by Requestors sourcing known edge machines, which have the appropriate content and by the reduction of network thrashing in sourcing content. Bandwidth utilization is improved by not overcaching edge machines based on random requests for content. Conflicts with other Requesters are removed by having the Manager not source Clients to busy edge machines. Also, edge devices are monitored over time to ensure that they are available, with bandwidth included in the definition of availability. An edge machine that does not support minimum bandwidth will not be made available to client machines for download. This improves overall delivery bandwidth and creates a very high quality of service network for content delivery while reducing network overhead. In addition, by discriminating on edge machines that can serve content, this invention takes advantage of a centrally controlled network while still minimizing the hardware requirements of the central controller (i.e. higher quality edge machines equate to less edge machines required to be in contact with the manager to support a particular network load). A Client continually monitors it's connection with any specific edge machine and if that connection quality is below a specified threshold, the Client will contact another edge machine from the original list provided by the Manager or by requesting a new list from the Manager. Therefore, a Client will always maximize the quality of the users download experience as witnessed by bandwidth and guaranteed delivery.

Figure 10:
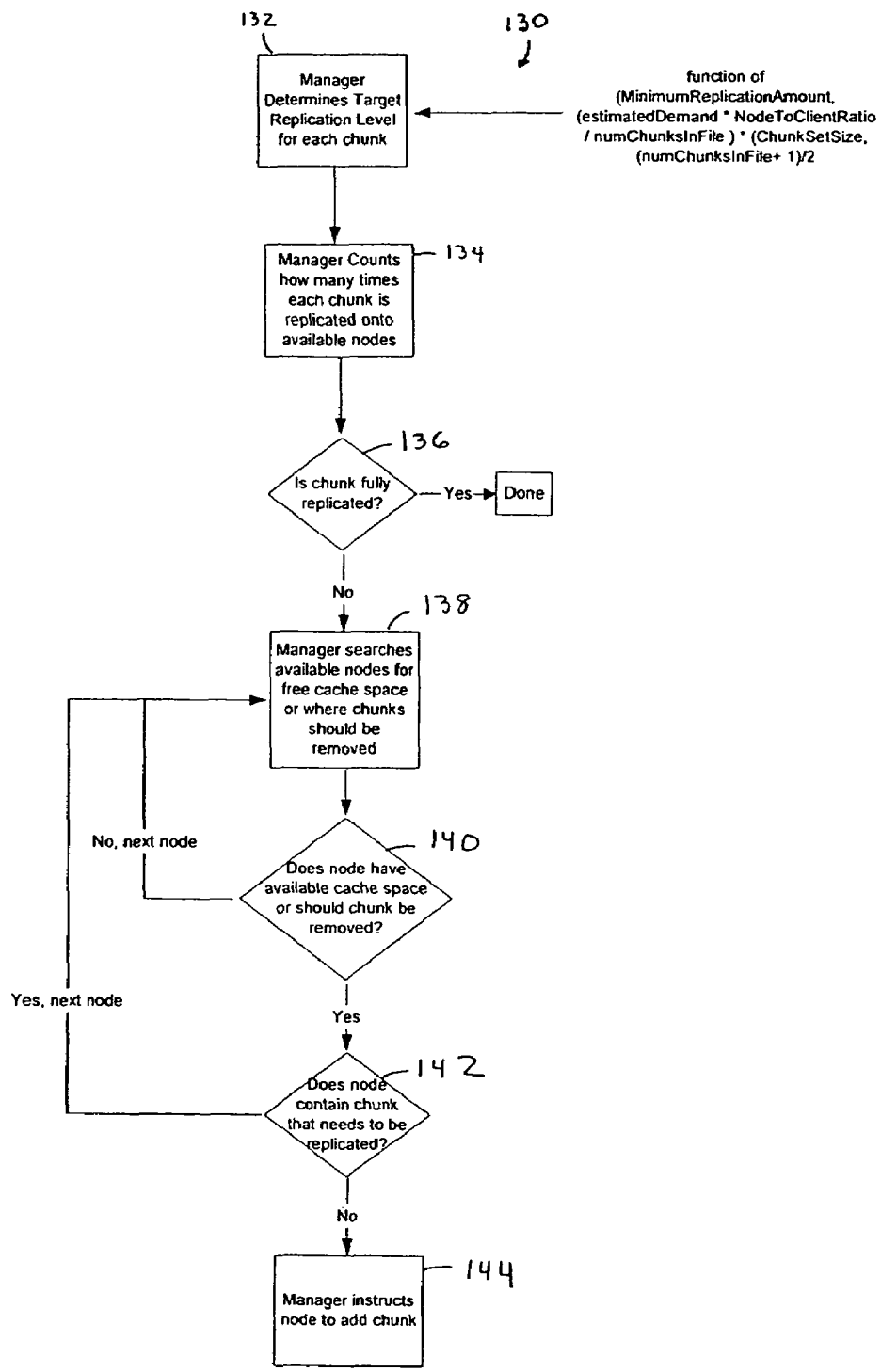
FIG. 10 is a logical flow diagram of a Distributed CDN that is centrally managed and where an Intelligent Manager is providing an improved cache management for network nodes in the network of the present invention.

FIG. 10 is a logical flow diagram of a Distributed CDN method that is centrally managed and where an Intelligent Manager is providing an improved cache management 130 for network nodes in the network of the present invention. In the method, the manager determines the target replication level for each chunk of content in step 132. In a preferred embodiment, the target replication level is a function of MinimumReplicationAmount, (estimatedDemand*NodetoClientRatio/numChunksinFile)* (ChunkSetSize, numChunksinFile+1)/2. In step 134, the Manager counts how many times each chunk is replicated onto available nodes. In step 136, the Manager determines if the chunk is fully replicated and the method ends if the chuck is fully replicated (e.g., replicated to enough nodes to meet the user demand.) In step 138, if the chunk is not fully replicated, the Manager searches the available nodes for free cache space or where chunks may be removed to accommodate the chunk to be replicated. In step 140, for each node, the Manager determines if the node has available cache space and should the chunk be removed. If the node does not have available cache space, then the method loops back to step 138 to check another node. If the node has sufficient cache space, then the Manager determines if the particular node contains a chunk that needs to be replicated in step 142. If the node does contain a chunk to be replicated, then the method loops back to step 138. In step 144, the Manager instructs the node to add the particular chunk.

The splitting of a content file into chunks or segments provides the benefit that two or more Requesters can download the same chunk from the same edge machine but avoid simultaneously using the edge machines by being separated by time. For example, Requester A can be downloading chunk 1 from edge machine 1 while Requester B is downloading chunk 2 from edge machine 2 and then during time period two, Requester A downloads chunk 2 from edge machine 2 while Requester B downloads chunk 1 from edge machine 1. This allows the system to replicate a content file in its entirety fewer times without affecting the ability of the VNO to satisfy Requester demand. It will be apparent to those skilled in the art that various modifications and variations can be made in the Method and System for Functional Separation in a Content Delivery Network of the present invention and in construction of this invention without departing from the scope or intent of the invention.

Figure 11:
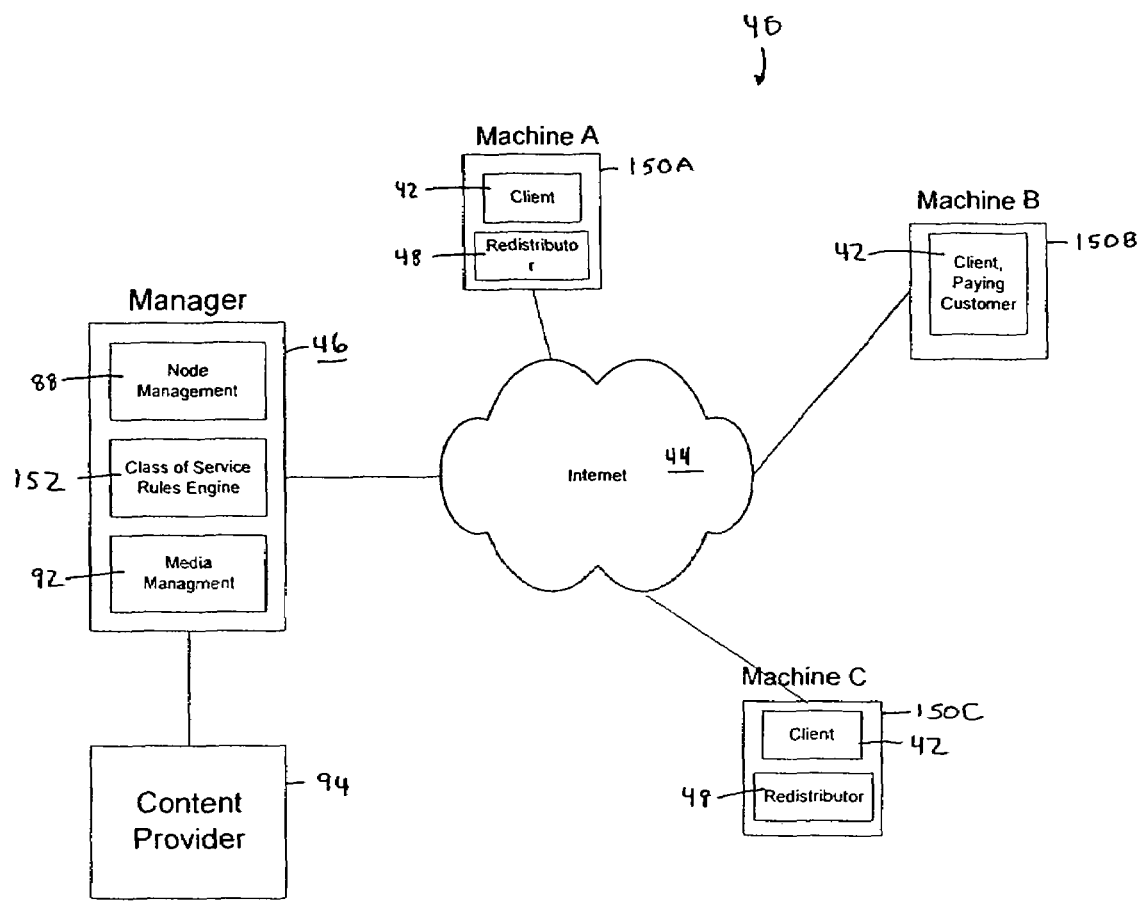
FIG. 11 is a schematic diagram of a Distributed CDN that is centrally managed and shows the central Manager function interconnecting with the client and redistributors to implement a rules based class of service system in the network of the present invention.

FIG. 11 is a schematic diagram of a Distributed CDN 40 that is centrally managed and shows the central Manager 46 interconnecting with the client 42 and redistributors 48 to implement a rules based class of service system in the network of the present invention. As shown in FIG. 11, the system 40 may include three computing resources 150A, 150B and 150C connected to the computer network 44. In the example shown in FIG. 11, the first computing resource 150A has the client software 42 as well as the redistributor software 48 as does computing resource 150C while computing resource 150B has the client software 42 only. The Manager has the node manager 88 and media manager 92 as described above and further comprises a class of service rules engine 152 that controls the class of service provided to each user based on various factors. In particular, the separation of client and server functions can be utilized to employ a class system in the network, whereby a different class of service is offered to different members of the network. This allows the implementation of an incentive system for some functions, whereby edge computers that install specific software that shares resources with the network will receive a premium class of service (always put at the head of the queue, more bandwidth, etc.) as opposed to end-users who only install the software on edge computers to access the network. This mimics the user characteristics of the Internet, where some end-users will share resources as opposed to others who will be free-loaders on the network. Similar to existing content delivery, the client is not forced to join a community or share computer resources, which provides for 100% reach to all users with respect to a CDN.

A central management function is capable of intelligent management of the class system. This accounting system can be rules based such that end-users only maintain status by having specific software installed and available to the network over time, for example an edge server is installed with the Redistributor on a particular machine and the edge server has been available to serve content more than 25% of the time over the last month resulting in the associated Client Requestor receiving priority and higher bandwidth services. Availability may further be defined by rules such as serving content with minimum bandwidth. Another rules based example is providing higher bandwidth service without any wait times to begin a download for all users who have subscribed and paid for the service. Other users who are "freeloaders" would receive wait times and would be provided lower bandwidth downloads, resulting in longer times to complete the download.

Functional separation of the server side components, which provide storage and content delivery services to Clients, from the client download manager in a software based CDN provides several benefits to both end-users and content distributors. The present invention is a non-facilities based "virtual" Content Delivery Network based on distributed computing, whereby functional separation is achieved with respect to the server side components and client download manager. In one embodiment of the present invention, shared services using edge servers are deployed and dispersed across the network and are used to serve data via a client download manager to end-users. The server side software, called a redistributor, is a separate application from the client download manager, which manages the download of digital content for end-users.

Figure 12:
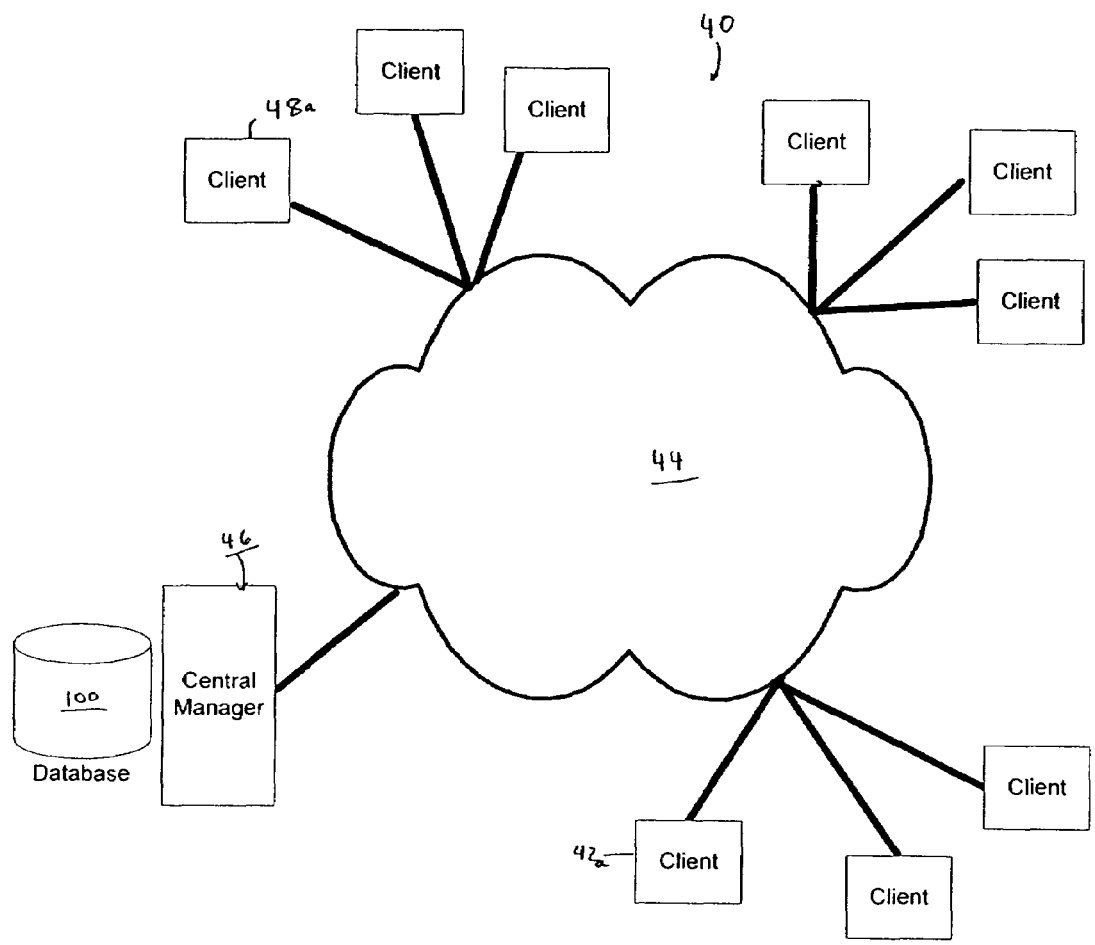
FIG. 12 is a schematic diagram of a distributed computing application utilizing a class system based on a rules based system that can include separation of functional components of a software based distributed Content Delivery Network of the present invention.

FIG. 12 is a schematic diagram of a distributed computing system 40 utilizing a class system based on a rules based system that can include separation of functional components of a software based distributed Content Delivery Network of the present invention. In particular, a client 42a installs only the download manager (the client side software) and does not share resources so that this client 42a receives a lower class of service. On the other hand, a node that downloads the redistributor software 48a does share resources and is given a premium level of service, such as priority, improved delivery speed and guaranteed access to the network. The central manager 46 keeps track of the redistributors over time and includes business rules (that the operator of the system can define) which controls which client are provided with premium service. The business rules may include redistributors that are available to the network over a specified time or users who subscribe to the premium content network for a fee.

Figure 13:
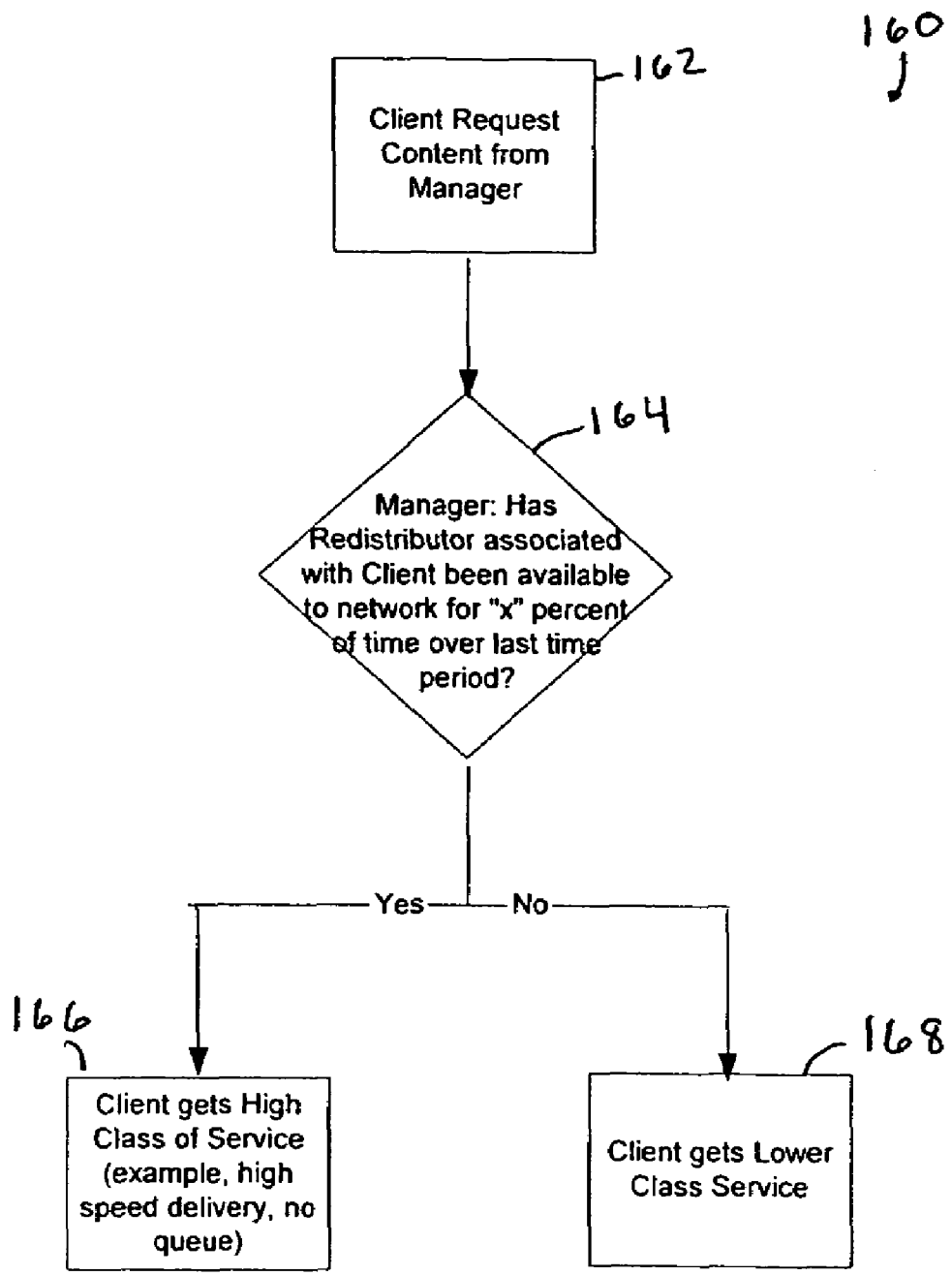
FIG. 13 is a logical flow diagram of a Distributed CDN that is centrally managed and shows the central Manager function determining class of service for clients requesting content.

FIG. 13 is a logical flow diagram of a Distributed CDN that is centrally managed and shows the central Manager function determining class of service 160 for clients requesting content. In step 162, a client requests content from the manager. In step 164, the manager applies some criteria to the client to determines its level of service. In a preferred embodiment, the manager may determine if the redistributor associated with the client has been available to the network for "x" percent of time over the last predetermined time period (although the business rules are flexible and may be based on operator or content owner criteria.) If the redistributor has met the criteria, then the client is provided with a high class of service in step 166. If the redistributor has not met the criteria, then it is provided with a lower level of service in step 168.

These functionally separate components may reside on the same machine or different machines, which has several benefits to both end-users and content distributors.

The present invention includes a mesh network, whereby content is cached on suitable edge servers with proximity to end-users called a Virtual Network Overlay™. Minimum bandwidth connections and storage resources may be factors that define suitable edge servers. The system of the present invention as contemplated is a private, gated network where content only reaches appropriate end-points. Content is secured within the network and piracy concerns can be addressed fully by the network. In an alternate embodiment the system can be a public one and not gated. Because the solutions' perceived value may be less as compared to free access to content (sometimes unauthorized access of more valuable content), a new value system must be employed whereby end-users are motivated to install the redistributor.

The separation of client and server functions supports/facilitates a class system to be employed in the network, whereby a different class of service is offered to different members in the network. This allows the introduction of an incentive system for the redistributors, whereby, for example, edge computers that install the redistributor software will receive a premium class of service (always put at the head of the queue, more bandwidth, etc.) as opposed to end-users who only install the client download manager. This mimics the user characteristics of the Internet, where some end-users will share resources as opposed to others who will be free-loaders on the network.

A central server called the VNO Manager performs intelligent management of the class system, utilizing a rules based system (the specific rules may be operator defined) that controls the benefits provided to end-users in the network who meet specific rules criteria. This accounting system can be rules based such that end-users only maintain status by having redistributors installed and available to the network over time. Availability may further be defined by rules such as serving content with minimum bandwidth. Other rules can include users who pay for access to content or provide other value to the network. For example, a manager may monitor paying users and allow those users priority access to content and faster delivery of content. The manager also monitors non-paying users and provides a lower class of service to this group.

There are many benefits over the prior art resulting from the architecture and method of content delivery of the present invention. First, functional separation removes barriers to end-users participating in the network. Also, this architecture reflects the principle that—at scale—members of a peer to peer system are not interested in the service of the greater good (a premise of most peer to peer systems), but are in fact motivated by greed, selfishness, and economic profit. To this end, we have invented an accounting and reward system that encourages users to become distributors. In addition, the central management function in the network has the benefit of accounting dynamically for the class system based on rules that the network operator specifies and may change based on new incentive structures or different types of users. The invention supports the many types of value systems that can be enjoyed by communities of content requesters.

Figure 14:
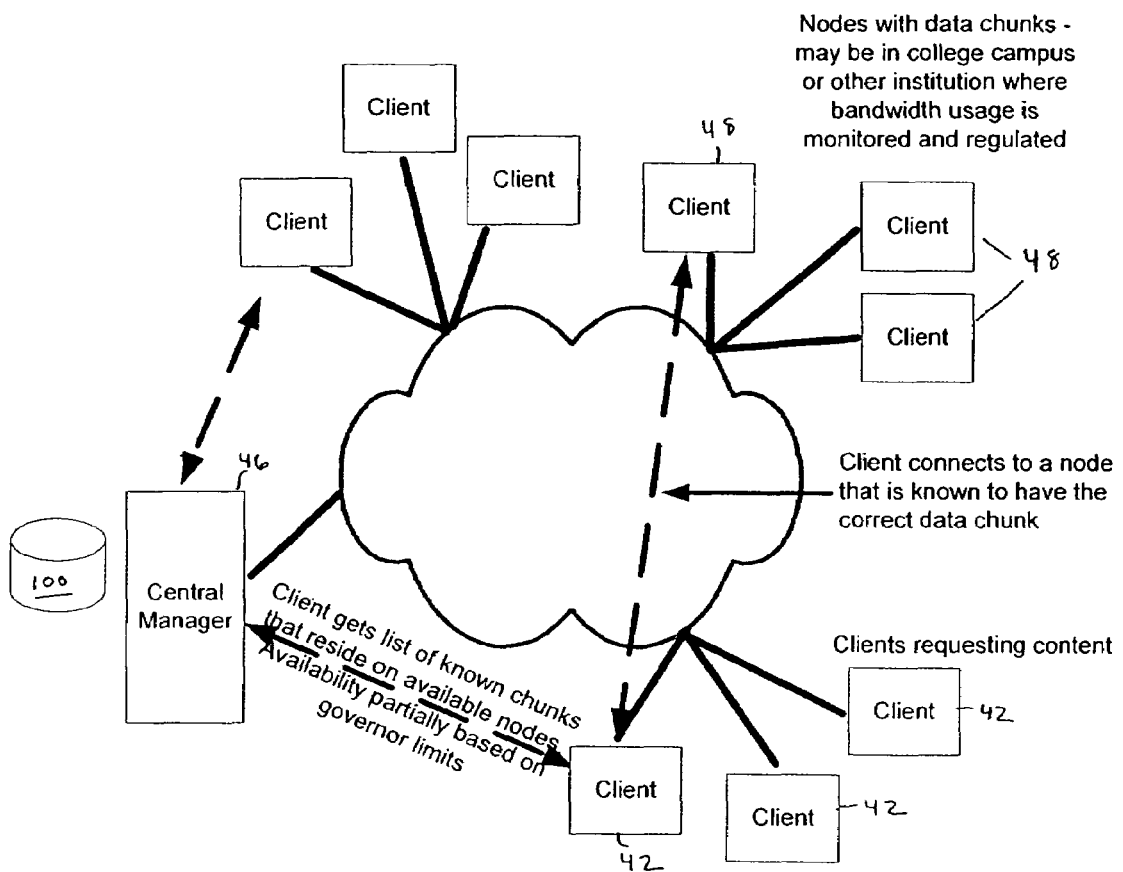
FIG. 14 is a schematic diagram of a distributed Content Delivery Network with central management, whereby nodes are provided limits on the number of bytes that can be transmitted over time.

FIG. 14 is a schematic diagram of a distributed Content Delivery Network 40 with central management, whereby nodes are provided limits on the number of bytes that can be transmitted over time. The present invention is a non-facilities based Distributed Content Delivery Network whereby a central server is used to control and manage the P2P network and files contained in the network. Distributor software and client software are functionally separated, allowing anyone to participate in the P2P network. The present invention has the capability to limit the number of bytes a machine running the Redistributor software can upload in a period of time (e.g. a day, week or month or multiple or fraction thereof). We will call this system a "governor" system and the number of bytes that can be uploaded in the time period the "upload limit".

The governor system allows the setting of an upload limit to be done in a number of ways. One method is that the upload limit can be set when the distributor software is installed on the edge machine. Another method is to allow an administrator of machines running the distributor software to set the limit, which could vary from a minimum level to unlimited. Still another method is to utilize the central server to select certain distributors and set their upload limits. In this last method, the administrator of the central server can select distributors based on different distributor characteristics such as domain, operating system, bandwidth, CPU speed, IP address, company, or some other means and set their upload limit values.

The governor function in the distributor software monitors the number of bytes uploaded. When a machine running the distributor software has reached the upload limit, the governor function on the distributor software prevents the uploading of additional content until a new time period begins or an administrator resets the upload limit value. Specifically, the distributor would either be unavailable as soon as the upload limit was reached, or it would continue with its current upload but be unavailable for additional uploads.

There are many benefits over the prior art resulting from the system architecture and method of content delivery of the present invention. First, network governance is introduced, whereby usage limits set by IT departments are not violated, which allows users to continue using the network under specific guidelines. This governor function has the added benefit of allowing institutions such as universities to provide service to their customers but still maintain overall network quality of service (QoS). Providing governors allows a network or subnetwork to be optimized by introducing a load balancing mechanism into the network. This can result in better overall network utilization.

As shown in FIG. 14, the central manager 46 keeps track of all node activity in the database 100 and can allow operators to set the node transfer limits (and knows which nodes have passed their limits.) A node may connect to the central manager 46 and report data transmitted over the last time period. Then, if the node is over the data limit set by the central manager 46, the node stops transmitting data until the next time period is initiated.

Figure 15:
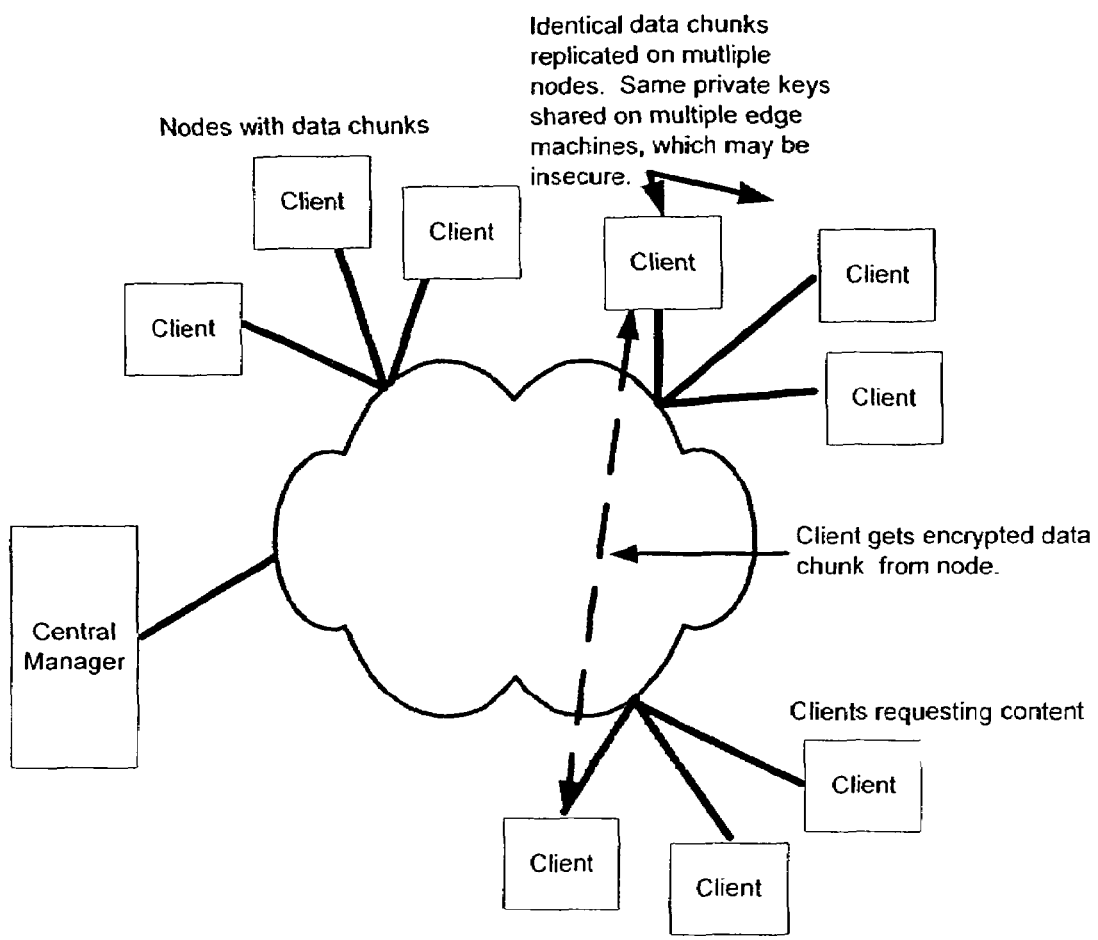
FIG. 15 is a schematic diagram of a client application utilizing distribution of encrypted chunks on edge machines of a software based distributed content delivery network of the present invention.
Figure 16:
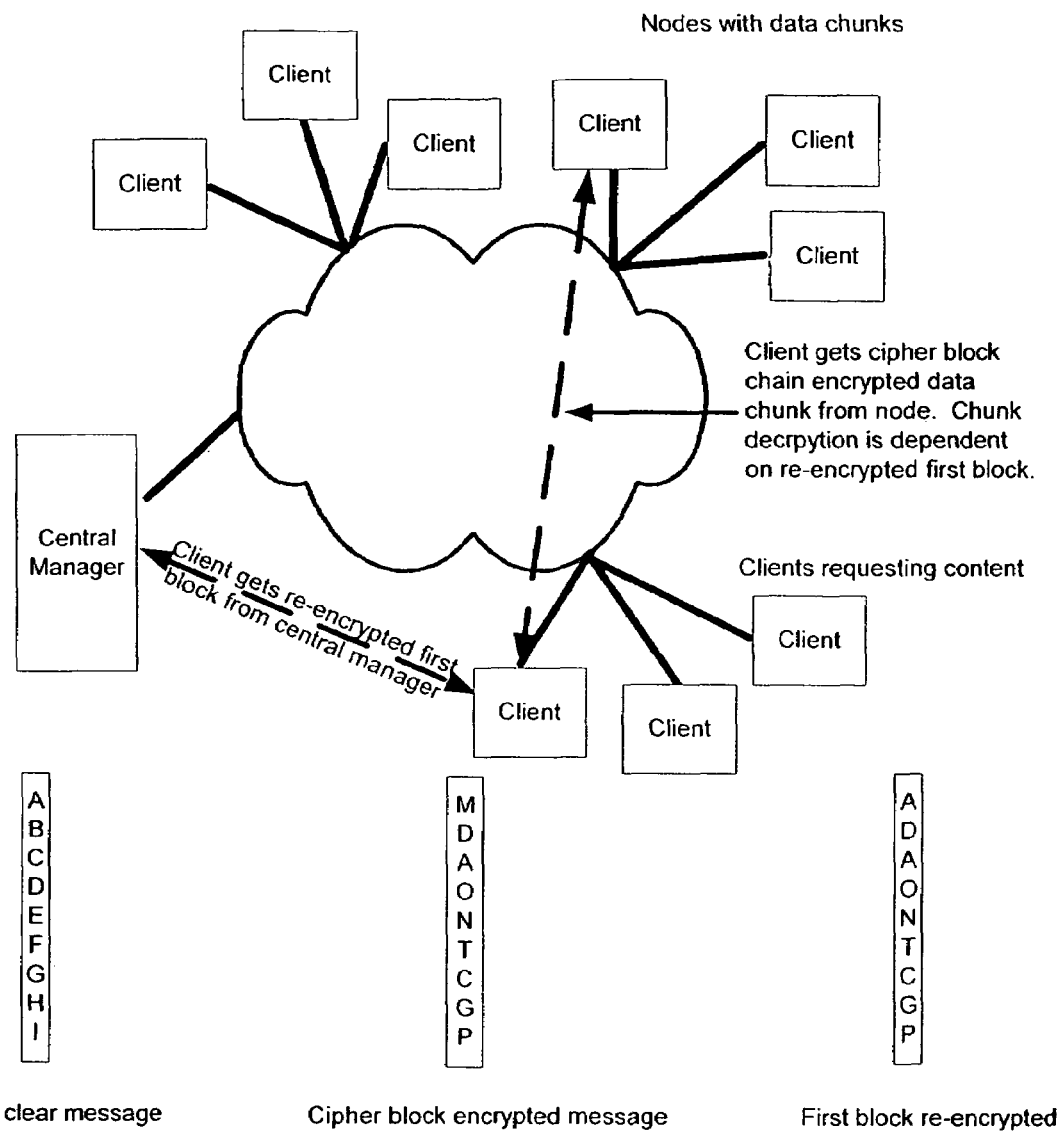
FIG. 16 is a schematic diagram of a client application utilizing distribution of encrypted chunks on edge machines with Ciper-block-chaining encryption of a software based distributed content delivery network of the present invention.

FIG. 15 is a schematic diagram of a thin client application utilizing distribution of encrypted chunks on edge machines of a software based distributed content delivery network of the present invention. FIG. 16 is a schematic diagram of a thin client application utilizing distribution of encrypted chunks on edge machines with Ciper-block-chaining encryption of a software based distributed content delivery network of the present invention. The present invention is a non-facilities based content delivery network whereby the network is centrally controlled and secured. This solution includes a mesh network whereby content is cached on suitable edge servers with proximity to Requesters. We will call this network, Virtual Network Overlay™.

The present invention includes using a cipher-block-chaining encryption method so that the content is pre encrypted using a standard private/public key. The public key may be well known and shared openly. Cipher-block-chaining encryption relies on the previous data to continue decryption. If a bit is changed anywhere in the content the content after that changed bit will not be able to be decrypted. So if the first block (a block can be data in any form) of a pre-encrypted content file is re-encrypted, then the remainder of the file may be left alone, but will not be de-cryptable until the first block is unencrypted. This means that the first block of a content file is always encrypted using a unique key and this key is only shared between a central server and the client program. The rest of the encrypted content file may be placed on the distributed content delivery system without worry about theft.

There are many benefits over the prior art resulting from the architecture and method of content delivery of the present invention. First, using Cipher-block-chaining encryption significantly reduces risk of content theft. By not allowing the sharing of keys between multiple users and one sender, theft of keys by others to access content is much more difficult. Using a unique key pair for each download session results in the static content on each edge machine being very secure from theft and the introduction of viruses.

Figure 17:
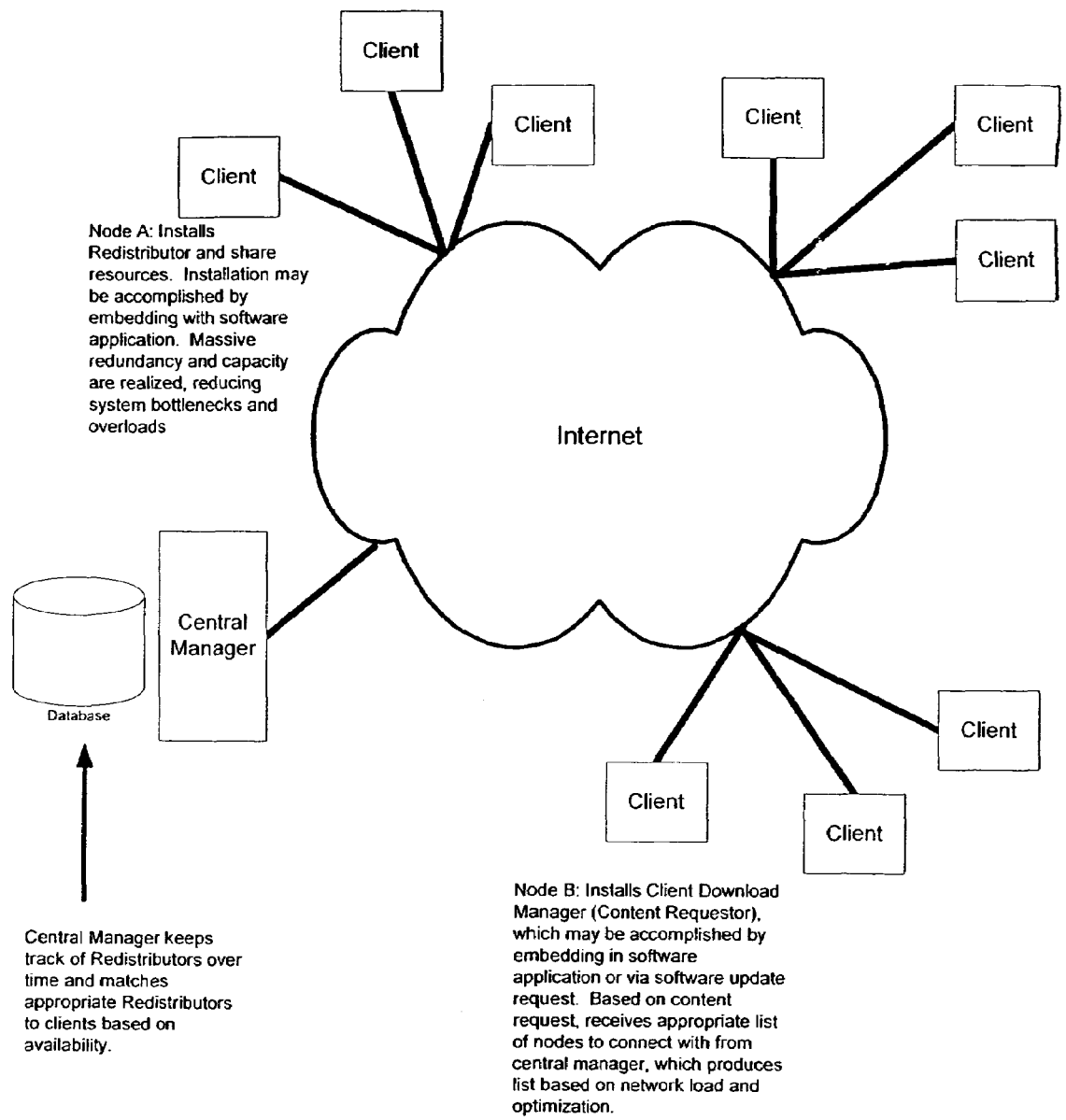
FIG. 17 is a schematic diagram of a distributed computing application and architecture to update application software in a distributed Content Delivery Network of the present invention.

A P2P network can be used to update software on client machines in a distributed manner. Such a P2P system can provide a cost effective and transparent method for distributing updates and patches to application software in a network by using the edge machines to store and serve files and a central server to control and monitor the network. FIG. 17 is a schematic diagram of a distributed computing application and architecture to update application software in a distributed Content Delivery Network of the present invention. Wherever possible, the same reference numbers will be used throughout the drawings to refer to the same or like parts (elements).

In a P2P system, special software needs to reside on the edge machines. This software includes a "distributor" function, which stores and manages files on the edge machine and distributes these files to other users on the P2P network. The software on the edge machines also include a "client" function, which is used to request files from the P2P network and download the files from other edge machines.

These special software components typically are not built into application software nor do they reside on application distribution media such as disks, CD's or DVDs. They must be downloaded and installed separately and are not integrated into the application update process.

The present invention includes a software architecture that distributes software updates from peer nodes, rather than from a central server. The edge server "distributor" software, the "client" software, or both can be embedded in software applications or distributed along with the software application either on the distribution media or in a package containing the application and the distributor/client software. This software would then be installed on end-user machines when the application is installed or at a later date. In either case, as soon as it is installed, the software can begin functioning to distribute and download application updates, patches, new versions, or even files unrelated to the application software from the P2P network. This software, because it is embedded in the application software, would not need to be distributed separately to the edge or client machines. The present invention includes one optimization of a P2P network whereby a central management function is used to control and manage the network and files contained in the network. Among other things the "distributor" component communicates with a central server to let it know it is online and available, retrieves and stores selected application files or updates from the central server as decided by the central server, and distributes these files to clients requesting them. The "client" component communicates with the central server to let it know what files it wants to download, gets directed by the central server to contact the appropriate edge machines (distributors), downloads the files, possibly getting pieces of the file from different machines, and assembles them together to form the file.

There are many benefits over the prior art resulting from the architecture and method of content delivery of the present invention. First, Integration of the P2P software with the application software provides seamless use of the P2P network as the application update source. Also, this architecture provides faster update times since load can be distributed across the network. In addition, the architecture can result in reduced costs for the software manufacturer, who can deploy new versions quickly and easily without having to centrally provision hardware and network capacity.

Figure 18:
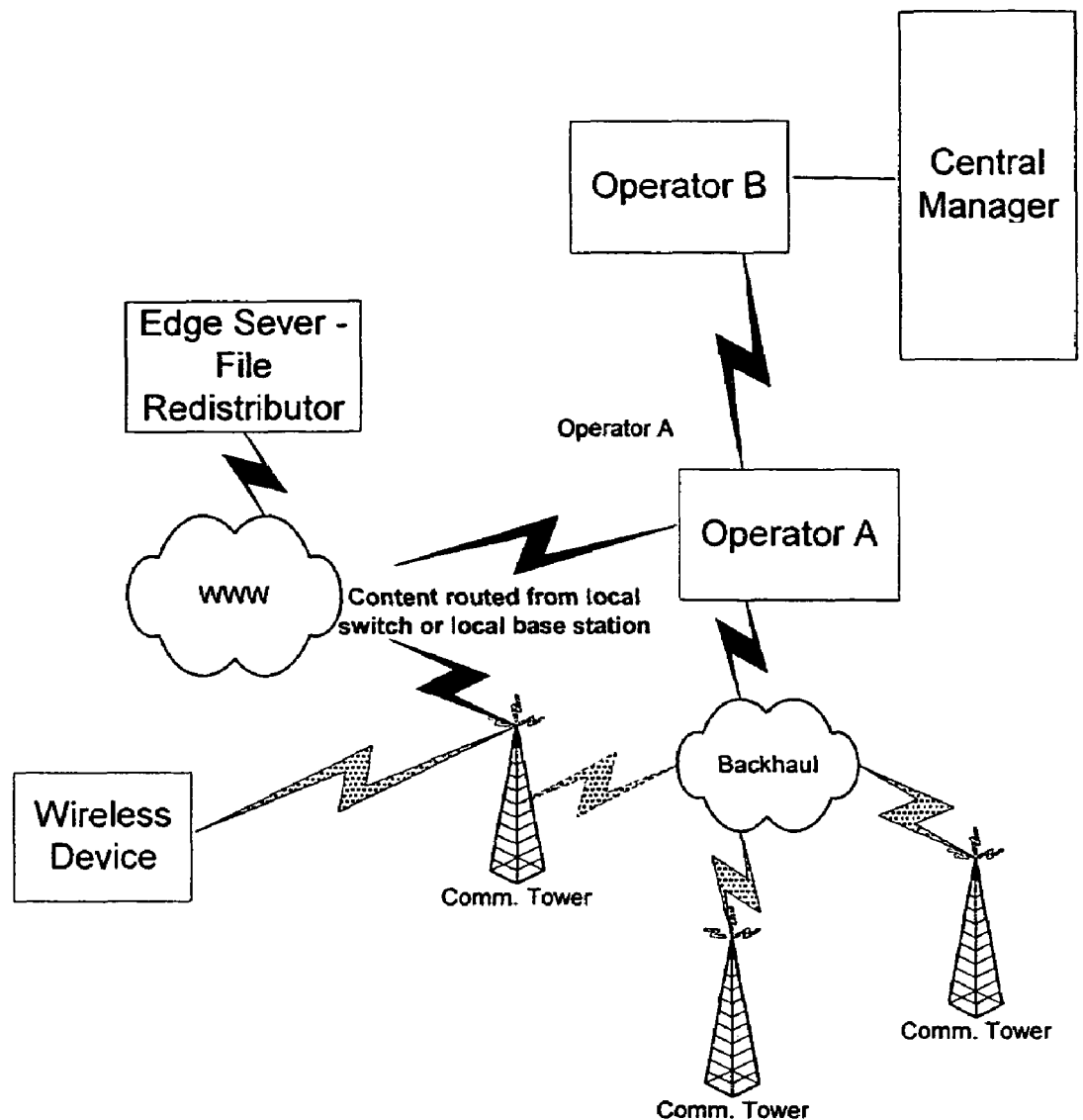
FIG. 18 is a schematic diagram of a distributed wireless Content Delivery System whereby content and billing is done locally on the roaming network of the present invention.

FIG. 18 is a schematic diagram of a distributed wireless Content Delivery System whereby content and billing is done locally on the roaming network of the present invention.

Wherever possible, the same reference numbers will be used throughout the drawings to refer to the same or like parts (elements).

The present invention is a non-facilities based Content Delivery Network whereby content is stored locally to the mobile customer. In this scenario, shared services using edge servers are deployed and dispersed across the network (the idea of proximity may be associated to both geography and the network).

This solution includes a mesh network whereby content is cached on suitable edge servers with proximity to mobile customers. The system of the present invention is called the "Virtual Network Overlay™" (VNO). Minimum bandwidth connections and storage resources are some of the factors that define suitable edge servers. Therefore, in this embodiment of the present invention, mobile devices most likely would not initially be considered as edge servers. The network operator could make this distinction optionally. However, a small footprint download application manager would be required for the mobile device.

Sourcing content would include the client mobile requesting content from the home operators' network. The home operator would be hosting the content manager, called the VNO™ Manager. The VNO™ Manager is responsible for introducing and maintaining content on the edge servers. Rather than routing the client back to the home network, the VNO manager would source the client to IP addresses on the public network in its locale. The client would download content locally by being routed form the local operators network. This avoids significant backhaul charges associated with inter-country roaming and also avoids any associated country tariffs. In addition, this method significantly reduces the network load for backhaul traffic and improves the clients' quality of service (QoS).

The gateway to the public network could be accomplished via the operators switching facility per current well-known topology. A further embodiment of the present invention is for the gateway function to reside in the local base station or super-base station, which the client is accessing. This again is capable of reducing backhaul traffic and provides better response and QoS.

In the embodiments of the present invention, billing would be handled similarly to a local telephone call, whereby local tariffs apply. Data records for billing would either be generated at the local base station or at the operators switching facility, depending on schema utilized.

The present invention is especially beneficial in the case where a parent operator owned both network operator A and network operator B. In this scenario, provisioning of the content data services could be accomplished via the mobile phone owners' desktop or home computer, and the mobile user could be induced to join the network based on cost, quality of service, or other parameters. Since large mobile operators have 10s of millions of customers, this is also an attractive path for a non-facilities based network to grow capacity.

There are many benefits over the prior art resulting from the architecture and method of content delivery of the present invention. First, Improved bandwidth, lower disconnects, and faster establishment of sessions would all be benefits of such as routing schema. Significant costs savings can be realized by routing clients locally and avoiding intra country tariffs. In addition, improved reliability and reduced latency are realized by routing clients through one network and to edge machines housing content in close proximity.

Localizing content nearer to its endpoint can improve download speeds, reduce failures and lost packets during download, and significantly avoid costs associated with inter-exchange/roaming agreements.

It will be apparent to those skilled in the art that various modifications and variations can be made in the Method and System for Functional Separation in a Content Delivery Network of the present invention and in construction of this invention without departing from the scope or intent of the invention.

Other embodiments of the invention will be apparent to those skilled in the art from consideration of the specification and practice of the invention disclosed herein. It is intended that the specification and examples be considered as exemplary only, with a true scope and intent of the invention being indicated by claims.

What is claimed is:

1. A content delivery system using distributed computing, the system comprising:
   a peer to peer content delivery network;
   one or more client download manager applications residing on and being executed by one or more end-user computer resources that are connected to the content delivery network;
   one or more redistributors applications residing on one or more end-user computer resources that are connected to the content delivery network;
   a centralized manager that controls the operation of the client download manager application and the redistributors application to manage the storage of content by the redistributors applications and to manage the delivery of content from the redistributors applications to the client download manager applications;
   wherein each client download manager application downloads content from any one of the one or more redistributors applications of the content delivery system and each redistributors application stores contents of the content delivery network as directed by the centralized manager and wherein the client download manager application and the redistributors application are functionally separated from each other; and
   wherein the centralized manager prevents content request collisions at end user computer resource having a redistributors application by time separating the requests from a plurality of client download manager applications so that a first client download manager application downloads a portion of a file from a first end user computer resource having a redistributor application and a second client download manager application downloads a different portion of the file from a different end user computer resource having a redistributor application wherein the first and second client download applications switch to the second end user computer resource having a redistributor application and the first end user computer resource having a redistributor application, respectively during a different time period.

2. The system of claim 1, wherein one of the one or more client download manager application requests a particular piece of content and wherein the centralized manager directs the particular client download manager application to the redistributors application that stores the particular piece of content.

3. The system of claim 2, wherein each end user computer resource executing a redistributors application communicates a status indication that is one of idle and busy to the centralized manager wherein the status indication affects the directing of one of the one or more client download manager application to a particular redistributors application.

4. The system of claim 1, wherein each end-user computer resource having a redistributors application further comprises a cache containing content to be distributed using the content delivery network and wherein the centralized manager maintains an inventory of the content in each cache.

5. The system of claim 4, wherein the centralized manager replicates a plurality of content files into the caches of each end-user computer resource having a redistributors application wherein the replication occurs based on content demand and content file size that results in non-uniform replication across the caches wherein a content with the same number of concurrent downloads will have larger files replicated fewer times than smaller files.

6. The system of claim 1, wherein content to be distributed but temporarily disabled for downloads, is pre-cached onto the redistributors applications before being enabled for downloads, in order to support initial end-user downloads directly from the redistributors applications.

7. The system of claim 1, wherein each computer resource further comprises a set of resources including file storage, bandwidth and processing load wherein the set of resources do not have to be shared with the content delivery network in order to download content from the content delivery network.

8. The system of claim 1, wherein the centralized manager further comprises a class system having one or more classes of services, wherein one of the one or more end-user computer resources executing the redistributors application, for one of a minimum period of time in a given time period and serving a minimum amount of content in a given time period, is assigned to a first class of service that is a higher class of service than one of a particular computer resource executing the client download manager application and a user not purchasing the rights to the first class and wherein the first class of service comprises benefits including a higher quality of service, a higher bandwidth download, a higher priority, or cash or credit compensation.

9. The system of claim 1 wherein the centralized manager further comprises a generalized, rules-based class system wherein benefits are granted to users in a higher class versus users in a lower class and wherein the class system can be established by one of paying cash or other payment to the network operator and paying cash or other payment to a content publisher and wherein the benefits include a higher quality of service, a higher bandwidth download, a higher priority, or cash or credit compensation.

10. The system of claim 1 further comprising a monitoring system that monitors and limits a number of bytes of content transferred from the redistributors to the client download manager applications during a predetermined time period.

11. The system of claim 10, wherein the monitoring system sets a different content transfer limit on the redistributors based on one of domain, geographic location, and IP address.

12. The system of claim 10, wherein the monitoring system prevents the transfer of additional bytes of content until the start of a new time period.

13. The system of claim 1 further comprising an encryption system that encrypts the content distributed by the redistributors to the client download manager applications, the encryption system encrypting the content using cipher-block chaining with a widely available set of keys to generate a first encrypted content and encrypting the first encrypted content with a tightly controlled set of keys.

14. The system of claim 1, wherein the content further comprises one or more files of the client download manager application software wherein the client download manager application software is updated using the content delivery network.

15. The system of claim 1, wherein the client download manager application and the redistributors application are embedded into a single computer resource.

16. The system of claim 1 wherein one of the client download manager application and the redistributors application are included in one of an application software media and an application software install package and wherein the client download manager application and the redistributors application are installed when the application software media is installed and wherein the peer to peer content network is used to update the application software with patches, updates and new versions.

17. The system of claim 1, wherein the computer resource further comprises a wireless device and wherein the centralized manager has a routing scheme for delivery of content to the wireless device.

18. The system of claim 17, wherein the redistributors applications further comprises an edge server local to the wireless device.

19. The system of claim 17, wherein the centralized manager has a localized routing scheme for content management and wherein the peer to peer content delivery network further comprises a public network that is accessed by a gateway function at a local base station of a wireless system.

20. The system of claim 17, wherein the client download manager applications and the redistributors applications are functionally separated on the wireless devices.

21. The system of claim 17 whereby a more cost efficient routing schema is utilized which bypasses roaming tariff structures and minimizes costs by routing content locally.

* * * * *